(12) United States Patent
Hallberg

(10) Patent No.: US 12,028,456 B2
(45) Date of Patent: Jul. 2, 2024

(54) SYSTEM AND METHOD FOR AUTHORIZING ACCESS OF LOCAL AND REMOTE CLIENT DEVICES TO SMART DEVICES IN A LOCAL ENVIRONMENT

(71) Applicant: Inter IKEA Systems B.V., Delft (NL)

(72) Inventor: Ted Hallberg, Osby (SE)

(73) Assignee: Inter IKEA Systems B.V., Delft (NL)

( * ) Notice: Subject to any disclaimer, the term of this patent is extended or adjusted under 35 U.S.C. 154(b) by 0 days.

(21) Appl. No.: 17/731,455

(22) Filed: Apr. 28, 2022

(65) Prior Publication Data
US 2022/0329429 A1    Oct. 13, 2022

Related U.S. Application Data

(63) Continuation-in-part of application No. PCT/EP2022/053525, filed on Feb. 14, 2022.

(30) Foreign Application Priority Data

Feb. 15, 2021  (EP) .................................... 21157054

(51) Int. Cl.
  *H04L 9/32* (2006.01)
  *H04L 9/08* (2006.01)
  *H04L 67/12* (2022.01)

(52) U.S. Cl.
  CPC .......... *H04L 9/3213* (2013.01); *H04L 9/0819* (2013.01); *H04L 9/0825* (2013.01);
  (Continued)

(58) Field of Classification Search
  CPC ... H04L 9/3213; H04L 9/0819; H04L 9/0825; H04L 9/0838; H04L 9/088; H04L 9/3271; H04L 67/12
  (Continued)

(56) References Cited

U.S. PATENT DOCUMENTS

2011/0219427 A1*  9/2011  Hito .................... H04L 63/0853
                                                                 726/3
2015/0372999 A1  12/2015  Pi-Sunyer
(Continued)

FOREIGN PATENT DOCUMENTS

EP  2650810 A1 * 10/2013 ............. G06F 21/31
EP  3661116 A1   6/2020
EP  4044552 A1   8/2022

OTHER PUBLICATIONS

PCT International Search Report and Written Opinion for PCT Application No. PCT/EP2022/053525 mailed Jun. 22, 2022 (15 pages).
(Continued)

*Primary Examiner* — Bryan F Wright
(74) *Attorney, Agent, or Firm* — Merchant & Gould P.C.

(57) ABSTRACT

A computer-implemented system for authorizing access to one or more smart devices provided in a local environment is disclosed herein. The system comprises a client device, a local network node, and a remote network node. The remote network node is configured generate a link and send it to an address associated with a personal identifier of the client device, and in response to the client device having executed the link, the client device being configured to receive an authorization code. The authorization code is locally or remotely validated based on a challenge previously generated by the client device. An access token is generated and sent to the client device, thereby authorizing the client device access to the one or more smart devices in the local environment.

20 Claims, 13 Drawing Sheets

(52) U.S. Cl.
CPC ............ *H04L 9/0838* (2013.01); *H04L 9/088* (2013.01); *H04L 9/3271* (2013.01); *H04L 67/12* (2013.01)

(58) Field of Classification Search
USPC .......................................................... 726/9
See application file for complete search history.

(56) References Cited

U.S. PATENT DOCUMENTS

| | | | |
|---|---|---|---|
| 2016/0277413 A1* | 9/2016 | Ajitomi | ............... G06F 21/6209 |
| 2017/0192402 A1 | 7/2017 | Karp et al. | |
| 2019/0342695 A1 | 11/2019 | Klein et al. | |
| 2020/0220853 A1* | 7/2020 | Xu | ........................ G06F 16/955 |
| 2022/0329429 A1 | 10/2022 | Hallberg | |

OTHER PUBLICATIONS

Extended European Search Report for EP Application No. 21157054.4 mailed Jul. 28, 2021 (9 pages).

Stormacq, "Alexa Account Linking: 5 Steps to Seamlessly Link Your Alexa Skill to User Systems that Requier Authentication : Alexa Blogs" 2019, XP055825092, https://web.archive.org/web/20190120170846/https://developer.amazon.com/blogs/post/tx3CX1ETRZZ2NPC/Alexa-Account-Linking-5-Steps-to-Seamlessly-Link-Your-Alexa-Skill-with-Login-wit.

PCT International Search Report and Written Opinion for PCT Application No. PCT/EP2023/061107 mailed Nov. 9, 2023 (14 pages).

\* cited by examiner

1000
Computer-implemented method for authorizing access to one or more smart devices (10) provided in a local environment (20):

By a client device (30) provided in, or external to, the local environment (20):

1010
Generating a challenge (32)

1012
Providing the challenge (32) and a personal identifier (34) to a local network node (40) provided in the local environment (20) upon the client device (30) being provided in the local environment, or to a remote network node provided external to the local environment upon the client device being provided external to the local environment By either one of the local network node (40), upon the client device (30) being provided in the local environment, or the remote network node (50), upon the client device (30) being provided external to the local environment (20):

1022
Generating authorization data (42) comprising at least an authorization code (42a)

By the local network node (40), upon the client device (30) being provided in the local environment:

1024
Sending the personal identifier (34) to the remote network node (50) provided external to the local environment (20)

By the remote network node (50):

1034
Generating a link (52)

1036
Sending the link (52) to an address associated with the personal identifier (34)

FIG. 10A

From Fig 10B    To Fig 10B

SYSTEM AND METHOD FOR AUTHORIZING ACCESS OF LOCAL AND REMOTE CLIENT DEVICES TO SMART DEVICES IN A LOCAL ENVIRONMENT

CROSS-REFERENCE TO RELATED APPLICATION(S)

This application is a continuation-in-part of PCT Application No. PCT/EP2022/053525, filed on Feb. 14, 2022, which claims priority to European Patent Application No. 21157054.4, filed on Feb. 15, 2021, the disclosures of which are hereby incorporated by reference in their entirety. To the extent appropriate, a claim of priority is made to the above-disclosed applications.

TECHNICAL FIELD

The present disclosure generally relates to access authorization. More specifically, the present disclosure relates to technical provisions for providing authorization of access to smart devices in a local environment.

BACKGROUND

Recent technology trends are showing a wide increase in homes or offices being connected to the Internet of Things (IoT). An IoT-based system is a system of interrelated "things", such as computing devices, mechanical and digital machines, objects, and even animals or people. Each thing within the IoT-system is generally provided with a unique identifier, so that it can be identified, transfer data, and communicate with other things within the system without requiring human interaction. The benefits of IoT-based systems are many, and involve, for instance, an improved quality of life, process monitoring, money and time savings, an increase in productivity, an increased revenue stream, and so forth.

By connecting homes and offices to the IoT, a number of challenges arise. Arguably one of the most critical challenges is related to data security and privacy. As data is constantly being collected, transmitted, stored and processed by various things in the IoT-based system, the data needs to be protected from malicious hackers, malwares, ransomwares, other types of software, or bots, etc. This is of particular importance in order to protect the integrity of devices, things, users and data associated with the IoT-based system.

The consideration of usability and efficiency versus security is also a much discussed topic. While it is desired to be able to quickly access a thing in as few and easy steps as possible, both locally from within a local network, and remotely via e.g. a cloud or wide area network, security must also be guaranteed. Moreover, certain things that are historically not associated with the Internet, such as ovens, lamps or ventilation systems, typically do not have any well-established security standards in place. Hence, connecting such things to the IoT-based system, by e.g. installing one or more communication means, may cause them to be exposed and thus an easy target for someone or something with malicious intent.

Current existing solutions that attempt to solve the problem of maintaining data integrity and providing secure and user-friendly authorization in IoT-based systems are often times insufficient in different aspects. Some solutions require exposure of critical information related to integrity or privacy or users or devices. As many existing IoT-systems involve storing personal information on cloud-based networks, people are constantly exposed to the risk of having their passwords and/or personal information breached. A few solutions fail with either one of the user-friendliness or security aspect, and others are overly complex and involve, for instance, expensive local gateways, routers or home or office appliances. Additional existing technologies may provide a decent solution for local configurations, whilst being unsatisfactory for remote configurations, or vice versa.

It is therefore desired to provide an authorization solution for IoT-based systems, which can maintain integrity and privacy of users, as well as assuring security and user-friendliness, for both local and remote connections.

In light of the observations above, the present inventor has identified a particular insightful approach of access authorization that offers improvements in terms of integrity, security and user-friendliness.

SUMMARY

At least some embodiments of the present disclosure eliminate or alleviate at least some of the problems or drawbacks referred to above.

In a first aspect, a computer-implemented system for authorizing access to one or more smart devices provided in a local environment is provided. The system comprises a client device provided in, or external to, the local environment; a local network node provided in the local environment; and a remote network node provided external to the local environment. The client device is configured to generate a challenge, and provide the challenge and a personal identifier to the local network node upon the client device being provided in the local environment, or to the remote network node upon the client device being provided external to the local environment. Either one of the local network node, upon the client device being provided in the local environment, or the remote network node, upon the client device being provided external to the local environment, is configured to generate authorization data comprising at least an authorization code. The local network node, upon the client device being provided in the local environment, is configured to send the personal identifier to the remote network node. The remote network node is configured to generate a link and send the link to an address associated with the personal identifier. Either one of the local network node, upon the client device being provided in the local environment, or the remote network node, upon the client device being provided external to the local environment, is configured to: in response to the client device having executed the link, send the authorization code to the client device, receive an access token request from the client device, the access token request comprising the authorization code, validate the authorization code based on the challenge, and upon successful validation of the authorization code: generate an access token, and send the access token to the client device, thereby authorizing the client device access to the one or more smart devices in the local environment.

In one or more embodiments, the access token is provided for the client device in the local environment, the local network node being configured to generate a local symmetric key, the remote network node being configured to generate a remote asymmetric key pair including a remote private key and a remote public key, wherein the local network node and the remote network node are configured to perform a key exchange.

In one or more embodiments, the remote network node is further configured to generate a complete encryption key by means of the local symmetric key and a remote symmetric key stored at the remote network node.

In a second aspect, a computer-implemented method for authorizing access to one or more smart devices provided in a local environment is provided. The method involves: by a client device provided in, or external to, the local environment: generating a challenge; and providing the challenge and a personal identifier to a local network node provided in the local environment upon the client device being provided in the local environment, or to a remote network node provided external to the local environment upon the client device being provided external to the local environment; by either one of the local network node, upon the client device being provided in the local environment, or the remote network node, upon the client device being provided external to the local environment: generating authorization data comprising at least an authorization code; and by the local network node, upon the client device being provided in the local environment: sending the personal identifier to the remote network node; by the remote network node: generating a link, and sending the link to an address associated with the personal identifier; and by either one of the local network node, upon the client device being provided in the local environment, or the remote network node, upon the client device being provided external to the local environment: in response to the client device having executed the link, sending the authorization code to the client device; receiving an access token request from the client device, the access token request comprising the authorization code, validating the authorization code based on the challenge, and upon successful validation of the authorization code: generating an access token, and sending the access token to the client device, thereby authorizing the client device access to the one or more smart devices in the local environment.

Embodiments of the method according to the second aspect of the disclosure may generally involve any or all of the functionality performable by any of the embodiments of the system according to the first aspect of the disclosure.

The provision of a computer-implemented system and method as disclosed herein will solve or at least mitigate one or more of the problems or drawbacks identified in the background section of this document. These and other aspects, objectives, features and advantages of the invention and its disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein.

All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

FIG. 10A illustrates a portion of a computer-implemented method according to one embodiment.

DETAILED DESCRIPTION

Figure 1A:
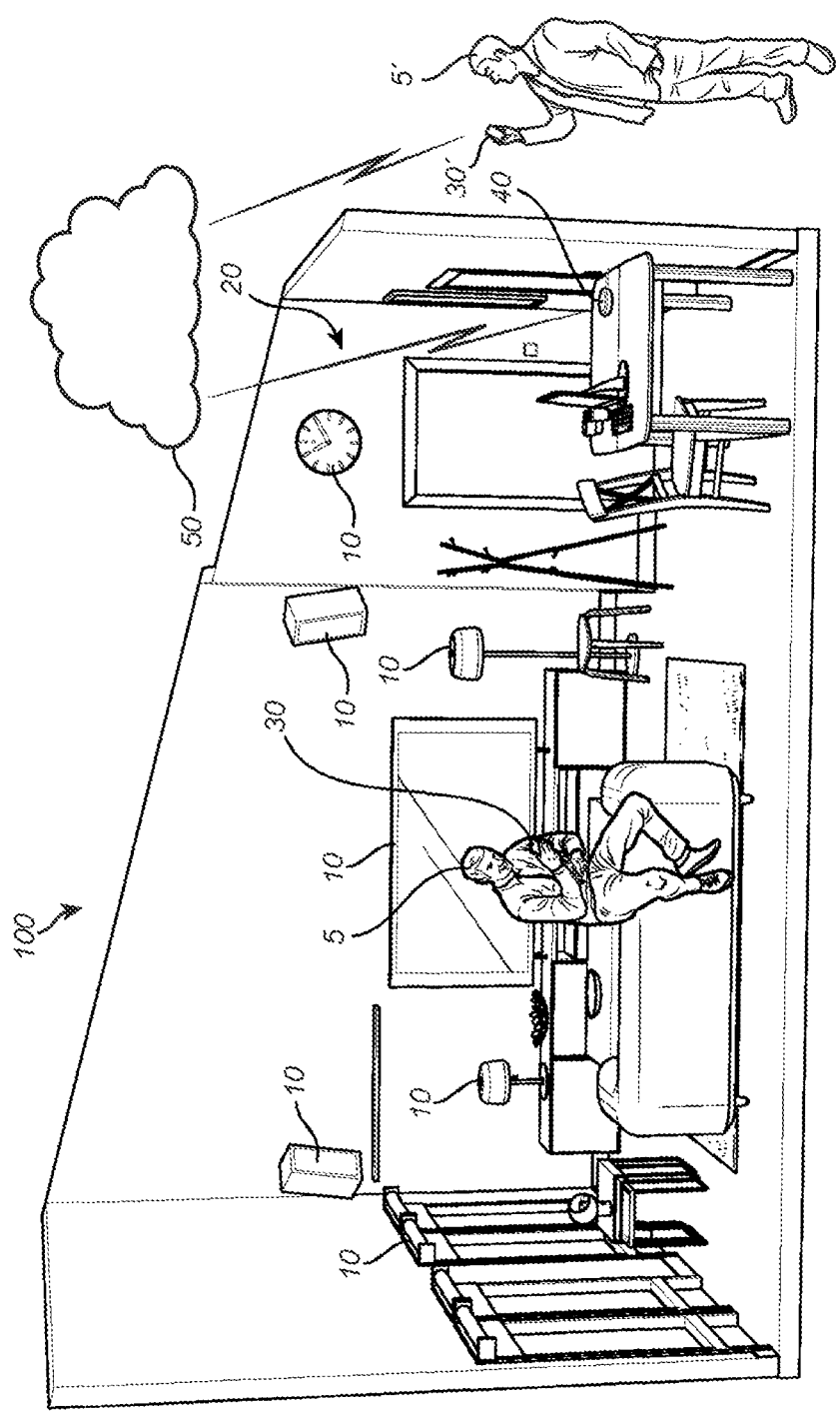
FIG. 1A is an embodiment of a local environment associated with an IoT-system comprising one or more smart devices.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

With reference to FIG. 1a, a local environment 20 illustrating a smart home is shown. The local environment 20 shown is to be viewed as a mere example of a potential smart home, in which the inventive concepts of the present disclosure can be applied. As will become apparent given the following detailed description, other environments may serve a similar purpose. A computer-implemented system 100 is provided in the local environment 20. The computer-implemented system 100 comprises a plurality of smart "things" 10, such as speakers, lamps, a TV, a clock and electric blinds. Each one of these "things" will hereinafter be referred to as a smart device 10. The system 100 further comprises a local network node 40, and a user 5 that is holding a client device 30.

Seen in FIG. 1a is also a second user 5' standing outside of the house, i.e. external to the local environment 20. The user 5' is holding a respective client device 30', which is connected to the local network node 40 via a remote network node 50, depicted as a cloud. The components of the system 100 will now be explained thoroughly with reference to FIG. 1b.

Figure 1B:
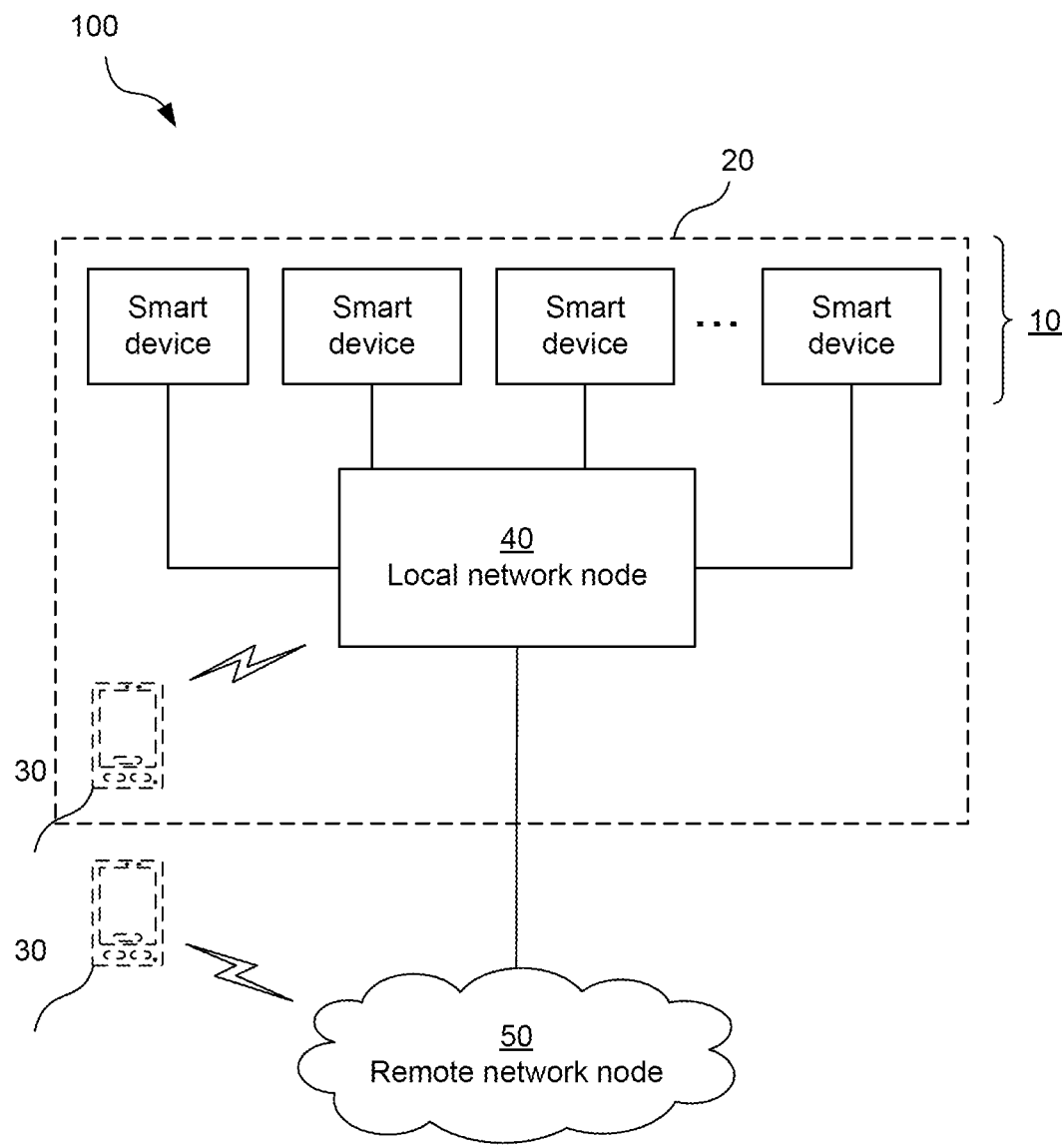
FIG. 1B is a block diagram of a computer-implemented system according to one embodiment.

FIG. 1b illustrates a block diagram of a computer-implemented system 100 according to some inventive aspects of the present disclosure. In FIG. 1b, the smart devices 10 depicted in FIG. 1a are represented as blocks. The system 100 is an IoT-based system 100, or simply an IoT-system 100. These different wordings will be used interchangeably throughout the description. As discussed in the background section of the present disclosure, the IoT-based system 100 is a system of interrelated "things", such as computing devices, electrical, mechanical and digital appliances, equipment, machines, objects, etc. (i.e. smart devices 10). The one or more smart devices 10 is to be interpreted as any type of device, structure, entity or object that, in some sense, is arranged or configured with communication means. The communication means are configured to enable the associated smart device 10 to communicate with other devices, structures, entities or objects that are provided or arranged in the same local environment 20 and also comprise some type of communication means. The communication means may hence be any type of controller, interface, sensor and/or intelligent device.

In preferred embodiments, the local environment 20 is a smart home or office. This essentially means that the local environment 20 is represented as the physical surroundings of a home or an office location. A home or an office location is in this sense to be interpreted as where people live or work. In alternative embodiments, the local environment 20 may be interpreted in the widest of sense, namely as any type of physical location that can be called a home or an office. A home or office may in such embodiments be e.g. any type of physical location having a defined area where people or animals live, visit, rent or spend time in, such as houses, accommodations, hotels, lobbies, theaters, planes, airports, lounges, trailers, campers, maritime vessels, and so forth. The term "smart" as used in relation with smart offices or homes is referring to the fact that said homes or offices provide, host or contain one or more smart devices 10.

In preferred embodiments, the one or more smart devices 10 are being selected from a group consisting of home furnishing, home appliances, home equipment, office furnishing, office appliances and office equipment. A home or office furnishing, appliance or equipment may be any type of object, device, structure or entity that is commonly found in a home or work location, that can appropriately be connected to an IoT-system for smart control, such at the IoT-system 100. A home or office appliance, furnishing or equipment may thus be one or more "things" associated with the IoT-system 100, including but not limited to a computer, phone, tablet, TV, speaker system, lighting system, sensors such as motion or light sensors, ventilation system, air condition, air purifier, heating system, electrical equipment or tool, bed, alarm system, alarm clock, garage port, planter, sauna, video game console, locking arrangement, vacuum cleaner, electric blind or curtain, desk, fridge, oven, stove, microwave, coffee machine or hot-tub. The skilled person can conceive other types of appropriate "things" that may potentially be represented as one or more smart devices 10. Alternatively, the one or more smart devices 10 may be any other type of device, object, structure or entity that is found in any of the kinds of local environments 20 listed above being appropriately configured with smart means for communication.

The system 100 further comprises a local network node 40. The local network node 40 is arranged somewhere within the local environment 20. The local network node 40 may be a local hub in the local environment 20, that is configured to be able to receive, send, store, and process data that is being sent between things associated with the local environment 20, such as for instance the one or more smart devices 10.

In a preferred embodiment, the local network node 40 is a gateway being configured as a local access point that is able to communicate with devices being connected thereto, as well as with other networks being provided external to the gateway. More preferably, the local network node 40 is an IoT-gateway based on known technologies in the art of IoT-gateways. An IoT-gateway may be configured as either one of a bus-based exchange protocol (data-centric), e.g. DDS, REST or XMPP, or broker-based exchange protocol (message-centric), e.g. AMQP, CoAP, MQTT, JMI. Alternatively, the local network node 40 may be a router or a switch, or additional similar types of networking hardware devices. The local network node 40 may be one device arranged at a specific location within the local environment 20. Alternatively, the local network node 40 may be two or more physical devices that are operatively connected and arranged at different locations within the local environment 20.

The system 100 further comprises a remote network node 50. The remote network node 50 is configured as a remote service that is capable of communicating with the local network node 40, e.g. through Internet. Such communication involves receiving and transmitting data. The remote network node 50 may be accessible external to the local environment 20, and is typically not configured to be able to communicate directly with the smart devices 10 without data first being routed through the local network node 40. In some embodiments, the remote network node 50 is configured to directly communicate with the one or more smart devices 10.

In a preferred embodiment, the remote network node 50 is a cloud-based service. A cloud-based service may be based on commonly known cloud-computing platforms such as e.g. Amazon Web Services®, Google Cloud Platform™, Microsoft Azure®, DigitalOcean®, IBM Bluemix® or Alibaba Cloud®. In alternative embodiments, the remote network node 50 may be configured as other types of networks that are distributed or provided external to the local environment 20.

The local network node 40 and the remote network node 50 each comprises some type of storage means configured to store data associated with the system 100. The storage means may be based on different or similar technologies. In one embodiment, the storage means may be physical hardware such as one or more or a combination of hard-disk drives, solid state drives, USB sticks or memory cards. In one embodiment, the storage means may be maintained by and/or configured as a cloud-based service, such as the cloud-based service of the remote network node 50. Connection to cloud-based storage means may be established using DBaaS (Database-as-a-service). For instance, cloud-based storage means may be deployed as a SQL data model such as MySQL®, PostgreSQL® or Oracle® RDBMS. Alternatively, deployments based on NoSQL data models such as MongoDB®, Amazon DynamoDB®, Hadoop® or Apache Cassandra® may be used. DBaaS technologies include, but are not limited to Amazon Aurora®, EnterpriseDB®, Oracle Database Cloud Service™ or Google Cloud™. In one embodiment, the storage means is a cloud storage gateway.

The system 100 further comprises a client device 30. In FIG. 1b, the client device 30 is depicted with dashed lines. The dashed lines indicate that the client device 30 may be provided inside or external to the local environment 20.

The client device 30 may access the IoT-system 100 and/or instruct the one or more smart devices 10 using two different modes. The first mode, wherein the client device 30 is provided external to the local environment 20, corresponds to remote access and will from now on be referred to as Access Away From Home (AAFH) (not shown). The AAFH mode may be requested whenever the client device 30 is accessing the one or more smart devices 10 from a location not being within the local environment 20, such as the home or office environment. For instance, the client device 30 may want to control pre-heating of an oven, turn on the air condition, activate the electric blinds if it is sunny outside, and so forth, while being located external to the local environment 20. The second mode, wherein the client device 30 is provided within the local environment 20, e.g. at home or at work, corresponds to and will be referred to as Local Access (LA) (not shown). The term "within" means that the client device 30 is directly connected to the local environment 20 via e.g. an associated local network node 40. For example, the client device 30 and the local network node 40 can be connected to the same Wi-Fi (i.e. Wireless local network WLAN) and/or Local Area Network (LAN). Correspondingly, the term "external to" means the opposite, i.e. that the client device 30 is not connected to the local environment 20 via an associated local network node 40. The two modes will be described thoroughly later on in this disclosure with reference to FIGS. 2-6.

In one embodiment, the client device 30 is a smart mobile communication device, such as a mobile phone, or alternatively a tablet computer, personal digital assistant, smart glasses, smart watch, smart bracelet, or any combination thereof. In alternative embodiments, the client device 30 is a personal computer, or similar.

In one embodiment, the client device 30 comprises functionalities for running or executing computer programs, such as a native, web-based or hybrid application. The application may have a backend (server-side service), a frontend (client-side service) and an associated Application Programming Interface (API). The client device 30 may be configured to receive input through one or more different input sources. The user (e.g. the user 5 or 5' shown in FIG. 1*a*) of the client device 30 may execute different functions by interacting with or manipulating the computer program, via e.g. a graphical user interface, speech-to-text interface, haptic interface, command line interface, gesture-based interface, augmented reality interface, or any similar type of interface technology. Executable functions requested by the user may involve, for instance, access authorization or control instructions to the one or more smart devices 10. This will be thoroughly described with reference to FIGS. 2-6.

Although not explicitly visualized in FIG. 1*b*, the IoT-system 100 comprises a plurality of communication means. As has been previously discussed, the communication means may be provided for the one or more smart devices 10 as to enable communication within the local environment 20. This is however not the only prevalent communication within the system 100, as the client device 30, the local network node 40 and the remote network node 50 also comprise similar or different types of means for communication. Communication means are necessary in order to enable the IoT-system 100 to perform its intended functionality and thus some of the inventive aspects of this disclosure. Communication is enabled in two directions, generally between a start node and an end node, wherein the smart devices 10, the local network node, the remote network node 50, and/or the client device 30 may be considered as end nodes or start nodes.

The plurality of communication means may be any known short-range or long-range communication techniques, or any combination thereof. Long-range communication techniques involve e.g. W-CDMA/HSPA, GSM, UTRAN, LTE, LTE-A, STARLINK or any technique configured to be available with the fifth generation (5G) communication standard. Short-range communication techniques involve e.g. wireless RF standards based on IEEE 802.11, IEEE 802.15, ZigBee, WirelessHART, WiFi, Bluetooth®, BLE, RFID, WLAN, mesh communication, or any other form of proximity-based device-to-device radio communication signal such as LTE Direct. Some known IoT-communication services which may be employed for short-range communication involve e.g. MQTT IoT, CoAP, DDS, NFC, AMQP, LoRaWAN, RFID, Z-Wave, Sigfox, Thread, EnOcean, cellularly based communication protocols. Communication techniques may also include, but not be limited to a beacon protocol such as iBeacon, AltBeacon, URIBeacon or Eddystone. Moreover, NFC or (ultra)sound communication can also be used as short-range communication in the local environment 20.

According to some embodiments, communication between the one or more smart devices 10 and the local network node 40 is enabled using short-range standards. Moreover, communication between the local network node and the remote network node 50 is enabled using long-range standards. Furthermore, communication between the client device 30 and the remote network node 50 is enabled using long-range standards. Additionally, communication between the client device 30 and the local network node 40 is enabled using short-range standards. The skilled person realizes that different configurations may apply.

Figure 2:
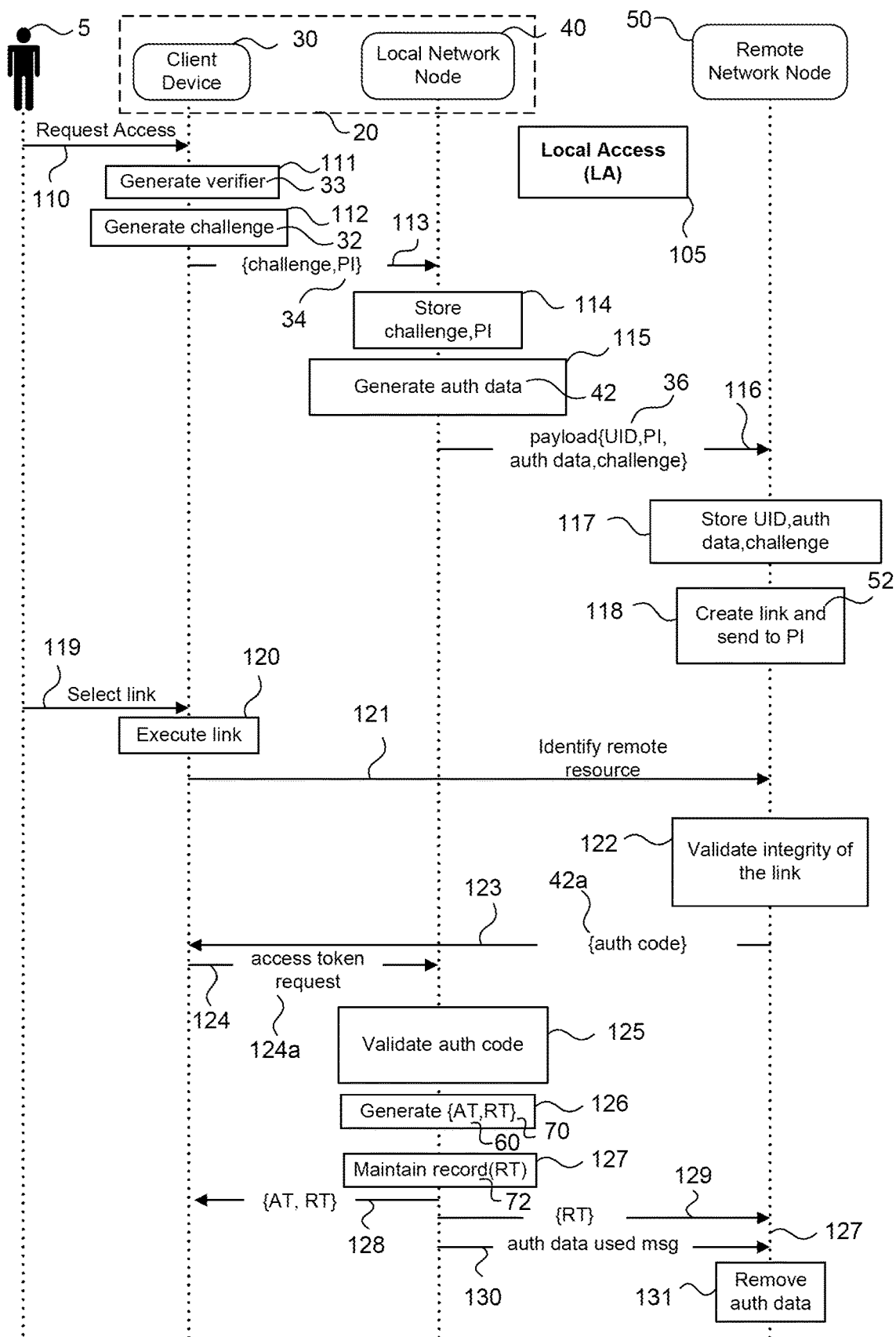
FIG. 2 is a flowchart diagram that illustrates access authorization according to an embodiment representing local access authorization.
Figure 3:
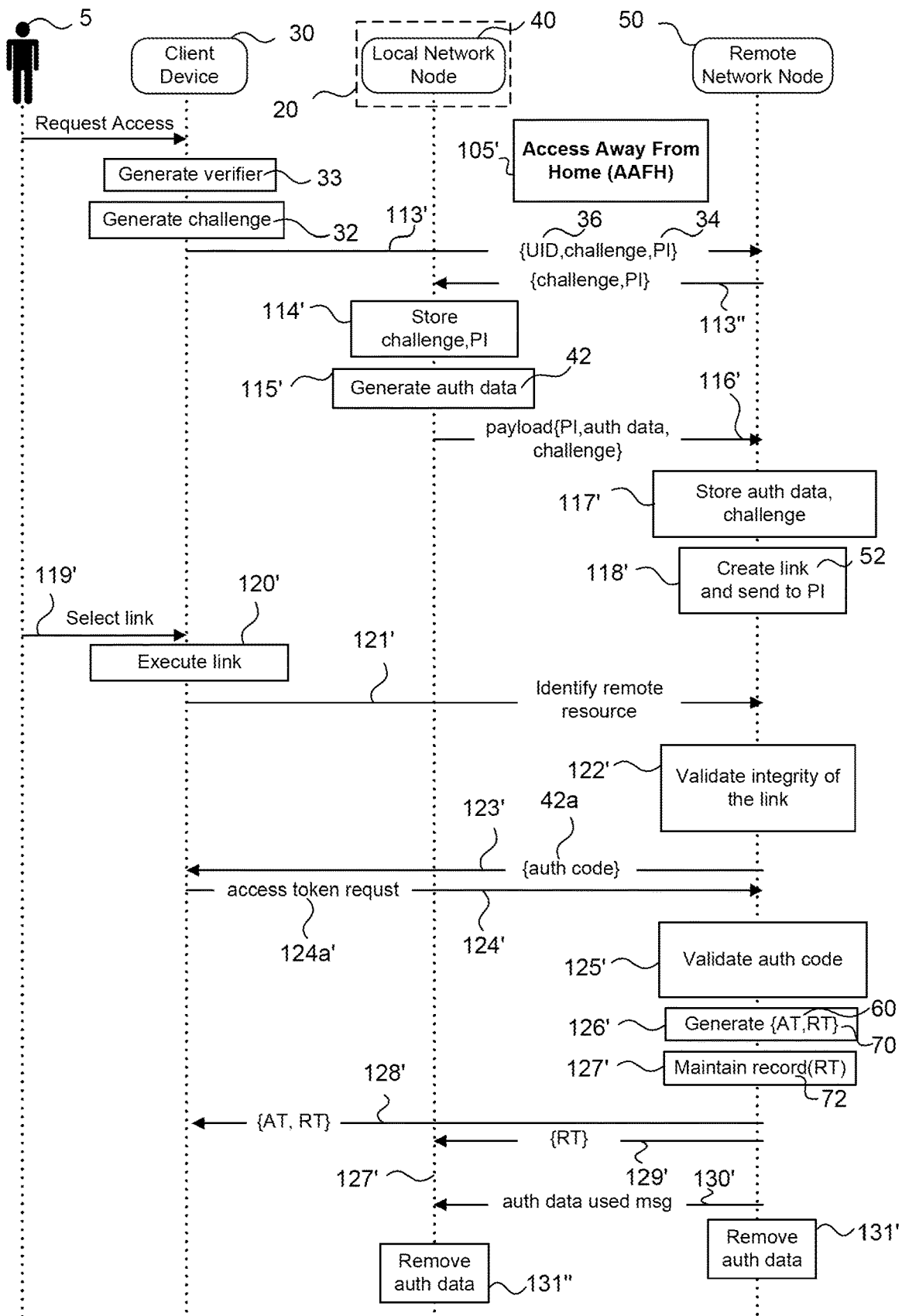
FIG. 3 is a flowchart diagram that illustrates access authorization according to an embodiment representing remote access authorization.

Turning now to FIGS. 2-3, two flowcharts of different embodiments of access authorization are visualized, which employ some of the inventive concepts of this disclosure. The flowcharts serve as exemplifying illustrations, which means that the access authorizations are by no means limited to the illustrations and description presented with reference to FIGS. 2-3. As the skilled person will realize, additional or fewer associated steps may be involved.

With reference to FIG. 2, a client device 30 is provided in the local environment 20 and is requesting access in a LA mode 105. The flowchart also illustrates the remote network node 50 provided external to the local environment 20, the local network node 40 provided in the local environment 20, and the user 5 of the client device 30. The user 5 is in most use cases present within the local environment 20, although certain scenarios where the user 5 is outside of the local environment 20 and interacting with the client device 30 being provided in the local environment 20 may be conceived.

Before access authorization is initiated, the local network node 40 and the remote network node 50 have exchanged signing or encryption keys. Such keys can, for instance, be provided using known public/private-key, or asymmetric, cryptography techniques. The exchange of signing or encryption keys may be involve configuring the local network node 40 to generate a key pair used for token signing and validation. The local network node 40 may then send the public key from that key pair to the remote network node 50. The remote network node 50 may then generate a key pair used for token signing and validation that is specific for that local network node 40. Subsequently, the remote network node 50 may send the public key from that key pair to the local network node 40. When this key exchange is done, the local and remote network nodes 40, 50 can sign tokens that the other party will trust. The respective private signing keys will preferably never leave the respective nodes 40, 50.

The access authorization is initiated by the user 5 performing 110 an access request by interacting with the client device 30 via any of the previously mentioned interface techniques. In response thereto, the client device 30 is configured to generate 111 a verifier 33. The verifier 33 may be generated using e.g. a high-entropy cryptographic random string comprising a plurality of characters. The client device 30 is further configured to hash the verifier 33, thereby generating 112 a challenge 32. The verifier 33 may be hashed using any known cryptographic hash functions, such as e.g. SHA-1, SHA-2, SHA-3, SHA-256, MDS, CRC32, RIPEMD or BLAKE2. A salt may be added to the verifier 33 before it is being hashed. The challenge 32 may further be encoded using any suitable encoding function, such as base64 URL.

When the client device 30 has generated the challenge 32, the client device 30 is further configured to provide 113 the challenge 32, together with a personal identifier 34, denoted PI in the figure, to the local network node 40. The personal identifier 34 is preferably associated with an email address. The personal identifier 34 may alternatively be associated with any type of identifier that appropriately identifies the user 5.

The local network node 40 is configured to store 114 the challenge 32 and the personal identifier 34 provided by the client device, and generate 115 authorization data 42. Preferably, the authorization data 42 comprises at least an authorization code 42a. The authorization data 42 may further comprise one or more randomly generated numbers. The authorization code 42a is not bound to personal details of the user 5, and may for instance be a random one-time hashed value which is insusceptible to e.g. potential crack attacks. The quantity of randomly generated numbers may vary, and different configurations may have a different quantity of randomly generated numbers.

Generally, with a higher quantity of random values, the design complexity of the system is increased, but the security is improved. Hence, the quantity of numbers may vary depending on safety, regulatory and compliance requirements associated with the IoT-system 100. For instance, providing access authorization to lower-security systems wherein it is possible to e.g. control a lamp in a home environment may only require one randomly generated number, whereas access authorization for high-security business process environments may require several randomly generated numbers.

Nevertheless, in a preferred embodiment, the authorization data 42 comprises two randomly generated numbers. If the authorization code 42a has been validated, it is an indication that the client device 30 has been provided access to one or more smart devices 10 in the system 100.

The local network node 40 is further configured to send 116 a payload comprising the authorization data 42, the challenge 32, the personal identifier 34, and in some embodiments also a unique client device identifier 36, denoted UID in the figure, to the remote network node 50. The unique client device identifier 36 may be the same identifier for different client devices 30 of the same user 5.

The unique client device identifier 36 is an identifier that is associated with the client device 30 in the IoT-system 100. The unique client device identifier 36 may, for instance, assume a value corresponding to an addition of an identifier of the local network node 40 and an additional randomly generated value. The identifier of the local network node 40 is an identifier that is unique for said local network node 40 in the associated IoT-system 100. The unique client device identifier 36 may, for instance, be a predetermined value that has been determined before the access authorization of the client device 30 is initiated.

In response to receiving the authorization data 42, the challenge 32, the personal identifier 34 and the unique client device identifier 36, the remote network node 50 is configured to store 117 the received authorization data 42, the challenge 32 and the unique client device identifier 36. Note that the personal identifier 34 is not stored. Not storing the personal identifier 34 at the remote network node 50 is an important design consideration, since it provides a maintained integrity of the user 5 of the client device 30. Since the personal identifier 34 is not stored in the remote network node 50, a person or software with malicious intent will not know what user is associated with the authorization data 42 or the challenge 32. The person or software with malicious intent trying to intercept, decrypt or decode information at the remote network node 50 will therefore be at loss.

Thanks to the above design consideration of the system, there is no need for a central database of any kind to store personal information, such as e.g. email addresses or passwords, related to users 5. There is hence no risk of a malicious person or software acquiring e.g. a database that comprises hashed passwords, as the only stored records are completely anonymized and contains no passwords or user email addresses. Thus, even if the malicious person or software somehow manages to retrieve or intercept some of the data used for authorization or control that is sent between any of the entities, no relevant personal information could be interpreted therefrom.

Instead of storing the personal identifier 34, the remote network node 50 is configured to generate and send 118 a link 52 to an address associated with the personal identifier 34. The link 52 is preferably a URL, or alternatively any similar type of string that identifies a virtual resource, e.g. a web page. The link 52 is based on at least parts of the authorization data 42, such as the authorization code 42a and/or the randomly generated numbers. Sending the link 52 may be handled by an appropriate email service known in the art, such as Amazon SES™. The link 52 is easy to open on the client device 30. In another embodiment, the link 52 may be opened on any other appropriate device(s) associated with the user 5. It may therefore possible to request access from the client device 30, and open the link 52 and trigger execution of the link 52 on a different device.

The link 52 may be generated as a composition of the randomly generated numbers, and it may identify a resource in the remote network node 50. "Identify a resource" is in this sense referring to that the link 52 is associated with a functionality of the remote network node 50. For instance, the link 52 may be capable of triggering execution of e.g. instructions, a task, a program or other types of resources or backend functionalities of the remote network node 50. Such execution may be triggered in response to the link 52 being executed by the client device 30.

In one embodiment, the link 52 can only be used one time, which makes it ineligible to fabricate false duplicate links 52 and thereby authorize a device 30 that is not supposed to be authorized.

In one embodiment, the link 52 is associated with or comprises a timer. Such timer may determine for how long the link 52 can be executed before it being automatically invalidated. For instance, the timer of the link 52 may be indicative of a time-to-live (TTL) of approximately 10 minutes. The TTL-value may be different depending on system configurations and security standards. The skilled person realizes that the TTL-value may assume an arbitrary value suitable for these type of authorization processes.

Hence, the link 52 can be seen as "secret" or "anonymous", in the sense that it is not associated with the user 5, and that it is generated from one or more completely randomly generated numbers. This makes it very difficult for the malicious person or software to discover the identity of the user 5, fabricate a false link 52, or in any other way intercept the access authorization flows described herein for gaining unauthorized access to the client device 30, the smart devices 10, the local network node 40 or the remote network node 50.

The resource of the remote network node 50 may be a resource that is maintained and/or executable by any of the previously mentioned cloud technologies. The resource may be directly associated with the remote network node 50. Alternatively, the resource may be implemented as a separate backend service that is in communication with the remote network node 50.

The next step shown in the flowchart in FIG. 2 is for the user 5 to select 119 the link 52 on the client device 30 (e.g. by clicking it in an email received from an email service of the remote network node 50, such as Amazon SES™), or alternatively on another device from which the link 52 can safely be accessed. In response to the user 5 having selected the link 52, the client device 30 is configured to execute it at 120. As a consequence, the identified resource of the remote network node 50 is triggered 121, by extracting information the randomly generated numbers in the link 52 and extracting the identifier of the local network node 40. In this step, the remote network node 50 may be configured to discard the one or more randomly generated numbers and sending 123 part of the authorization data 42 to the client device 30. Specifically, it is the authorization code 42a that is being sent 123 to the client device 30. This process is effectively performed while still maintaining the integrity of the user 5, i.e. not exposing any sensitive personal information such as e.g. the personal identifier 34. Discarding the one or more randomly generated numbers provides particular security improvements over known art as it eliminates future traceability associated with the authorization process. Moreover, discarding the randomly generated numbers makes sure that the link previously sent cannot be triggered again. Triggering the identified resource at the remote network node 50 enables validation 122 of the integrity of the link 52, which improves the overall security of the system. The validation 122 of the integrity of the link 52 is in one embodiment done by extracting link parameters from the link, such as the one or more randomly generated numbers, and compare the link parameters to data stored 117 in the remote network node 50 to validate that the link 52 indeed is valid. If the link parameters can be found among the stored data, the link is valid. If not found, the link is not valid. By configuring data records (such as the authorization data 42) stored 117 in the remote network node 50 with a TTL of for example 1, 5, 7, 10, etc., minutes, the security may be improved since the user must trigger the link before the associated authorization data 42 is deleted at the remote network node. By deleting the randomly generated numbers once an associated link is triggered, the link 52 can only be used/triggered one time.

The local network node 40 is further configured to convert the validated authorization code 42a into an access token 60 (denoted AT in the figure) to be used by the client device 30 when controlling the one or more smart devices 10. This process involves receiving 124 an access token request 124a from the client device 30, wherein the access token request 124a comprises the authorization code 42a. The local network node 40 may further be configured to receive a verifier 33 in addition to, or together with, the access token request 124. The verifier 33 is the same verifier 33 that was previously generated in step 111, and used to generate 112 the challenge 32. When the local network node 40 has received 124 the authorization code 42a and the verifier 33, the verification procedure 125 may, for instance, involve generating a control challenge (not shown) for the authorization code 42a being based on the verifier 33 using the same hashing technique as was used for generating 112 the challenge 32. This control challenge may then be compared with the stored challenge 32 as received 113 from the client device 30. If there is a match, i.e. the control challenge matches the stored challenge 32, an access token 60 is generated 126 and sent 128 to the client device 30. The access token 60 may comprise an authorization signature and an expiry time, and is associated with the unique client device identifier 36. The expiry time may vary, but are in most cases approximately 24 hours. When the client device 30 has received the access token 60, the client device 30 is given access control to the IoT-system 100 in different ways. Such access control will be further discussed with reference to FIGS. 4 and 5.

In one embodiment, the local network node 40 is configured to generate 126 a refresh token (denoted RT in the FIG. 70 together with the access token 60. This is also shown in FIG. 2. Both the access token 60 and the refresh token 70 are preferably generated as JSON web tokens, or any similar token technology such as e.g. OAuth2, Auth0 or Amazon Cognito™. The tokens 60, 70 may in some embodiments be encrypted if sensitive information is to be stored therein. The refresh token 70 may comprise an expiry time and is associated with the unique client device identifier 36. The local network node 40 is configured to send 128 the refresh token 70 to the client device 30 together with the access token 60. Moreover, the local network node 40 is configured to send 129 the refresh token 70 to the remote network node 50.

Upon generation 126 of the refresh token 70, the local network node 40 may be configured to maintain 127 a record 72 of said refresh token 70. This record 72 is responsible for maintaining relevant data associated with the refresh token 70 for the specific client device 30 which it was generated for. Such relevant data may involve instructions for generating a new access token 60 if it has expired. The record 72 may also be an overall record 72 comprising information of all the refresh tokens 70 which have been generated for any number of users. For instance, the record 72 may maintain a list of refresh tokens 70 and unique client device identifiers 36 associated with each token 70. Additional relevant data which may be appropriate to keep track of may include expiry times of each refresh token 70, access tokens 60 associated with the refresh tokens 70, a number of generated access tokens 60 and/or refresh tokens 70, statistical data related to access or control, and so forth. Upon the remote network node 50 having received the refresh token 70, the remote network node 50 may be configured to maintain 127 a record of said refresh token 70, using a similar procedure as the local network node 40.

In different situations, it may be necessary to regenerate, replace or exchange the access token 60 and/or the refresh tokens 70. This is to improve the overall authenticity of the generated tokens 60, 70 and thus the security of the system 100. Such situations involve, for instance, when either one of the tokens 60, 70 is for some reason marked as invalid, due to e.g. an invalid authorization signature, a passed (lapsed) expiry time, or a mismatch in unique client device identifier 36 and client device 30. If the expiry time of the access token 60 has passed, the refresh token 70 is typically used for generating another access token 60. If the refresh token 70 has expired, the user may be required to re-authorize to the system 100 by performing the authorization process once more in order to receive new access and refresh tokens 60, 70. Another situation may be that the client device 30, provided by the refresh token 70, has requested a new access token 60. Yet another situation may be conceived, wherein the expiry time of the refresh token 70 is about to pass, and an access token 60 has been generated. This may cause the local network node 40 to trigger generation of a new refresh token 70, so as to avoid a situation where the user 5 is required to re-authenticate to the system 100 at a later stage when the old refresh token 70 would have been expired.

FIG. 2 further shows a step after the tokens 60, 70 have been generated and distributed, and the record 72 maintained, wherein the local network node 40 is configured to transmit 130 a message to the remote network node 50. This message indicates that the authorization data 42 has been used, and particularly that the validated authorization code 42a has been consumed. Consequently, to further improve upon the integrity of the user 5, the remote network node 50 is configured to discard 131 the remainder of the authorization data 42, i.e. the stored authorization code 42a. Hence, a person or software with malicious intent will not be able to retrieve any of the authorization data 42 by listening to or trying to attack the remote network node 50 once the access and refresh tokens 60, 70 have been generated and distributed.

With reference to FIG. 3, a client device 30 is provided external to the local environment 20 and is requesting access in the AAFH mode 105'. The flowchart also illustrates the remote network node 50 provided external to the local environment 20, the local network node 40 provided in the local environment 20, and the user 5 of the client device 30. The user 5 is in most use cases located external to the local environment 20, although certain scenarios where the user 5 is inside the local environment 20 and interacting with the client device 30 being provided external to the local environment 20 may be conceived.

Before access authorization is initiated, the local network node 40 and the client device 30 ideally have a pre-established relationship. Such relationship may be required in order for the remote network node 50 not to store any personal details of the user 5 during the AAFH 105' authorization process. The pre-established relationship may, for instance, relate to the client device 30 being provided with some type of information, such as the identifier of the local network node 40. This is to ensure that the client device 30 knows what local network node 40 the one or more smart devices 10 are in communication with.

Following FIG. 3, it can be seen that many of the AAFH 105' authorization events are similar to those of the LA 105 authorization events as described with reference to FIG. 2. However, there are some configuration differences, which will now be described.

As the client device 30 is located external to the local environment 20, communication is not initiated directly with the local network node 40, but instead with the remote network node 50. The client device 30 is hence configured to transmit 113' the generated challenge 32 and the personal identifier 34 to the remote network node 50. By doing so, the remote network node 50 will also receive the unique client device identifier 36. An important aspect, however, is that the remote network node 50 does not store any personal details of the user 5 that may compromise the integrity of said user 5. The remote network node 50 is further configured to route 113" the challenge 32 and the personal identifier 34 to the local network node 40. To summarize, the client device 30 is configured to provide the challenge 32 and the personal identifier 34 to the local network node 40, via the remote network node 50.

As is seen in FIG. 3, the steps 114', 115', 116', 117', 118', 119', 120', 121' and 122' are, preferably, performed similarly to those described with reference to FIG. 2 (114, 115, 116, 118, 119, 120, 121). Note that the unique client identifier 36 has already been stored at the remote network node 50, as it was received at 113.

In the AAFH 105' authorization mode, it is not the local network node 40, but instead the remote network node 50, that is configured to validate 125' the authorization code 42a. The remote network node 50 is configured to perform this process similarly as the local network node 40 did with reference to FIG. 2.

The remote network node 50 is further configured to generate 126' the access token 60. Moreover, the remote network node 50 may be configured to generate 126' the refresh token 70 together with the access token 60. This may be performed generally in accordance with what was described with reference to FIG. 2, along with distribution 128' of the tokens 60, 70. However, as it is the remote network node 50 that is configured to generate 126' the tokens 60, 70, and not the local network node 40, it is instead configured to transmit 129' the refresh token 70 to the local network node 40. Moreover, both the remote network node 50 and the local network node 40 are configured to maintain 127' the record 72 of the refresh token 70 generally in accordance with what was described with reference to FIG. 2.

When the tokens 60, 70 have been generated and distributed, the remote network node 50 is configured to transmit 130' a message to the local network node 40 stating that the authorization data 42 has been used, and particularly that the validated authorization code 42a has been consumed. Consequently, to further improve upon the integrity of the user 5, the remote network node 50 is configured to discard 131' the remainder of the authorization data 42, i.e. the authorization code 42a. In one embodiment, as further described above, the remainder of the authorization data 42, i.e. the authorization code 42a and the one or more random values, may be associated with a time stamp. Such time stamp may assure that the remaining data will be discarded after some time, in case either one of the local network node 40 or the remote network node 50 for some reason does not receive the message as described above. The time stamp may, for instance, assume a value of five minutes. The skilled person realizes that any appropriate time stamp value can be assumed. Moreover, as the local network node 40 previously generated the authorization data 42 at 115', it is now configured to discard the remainder of it at 131" as the authorization has been performed.

The LA-mode and the AAFH-mode have now been described with references to FIGS. 2 and 3. With the authorization procedure described herein, the access authorization may be initiated in the LA-mode and finished in the AAFH-mode, shall the client device 30 exit the local environment 20 at any point in the procedure. Oppositely so, with the authorization procedure described herein, the access authorization may be initiated in the AAFH-mode and finished in the LA-mode, shall the client device 30 enter the local environment 20 at any point in the procedure. For example, the request 110 for authorization may be done when the user is within the local environment, while the selecting 119 of the link may be done when the user is external to the local environment, or vice versa.

The access authorization in either one of the LA-mode or the AAFH-mode enables further control of the one or more smart devices 10 in either one of the LA-mode or the AAFH-mode. Hence, once the access token 60 and/or the refresh token 70 have been provided for the client device 30 in either one of the LA-mode or the AAFH-mode, control of the smart device(s) 10 may be performed in either one of the modes, regardless of how the access was provided.

Figure 4:
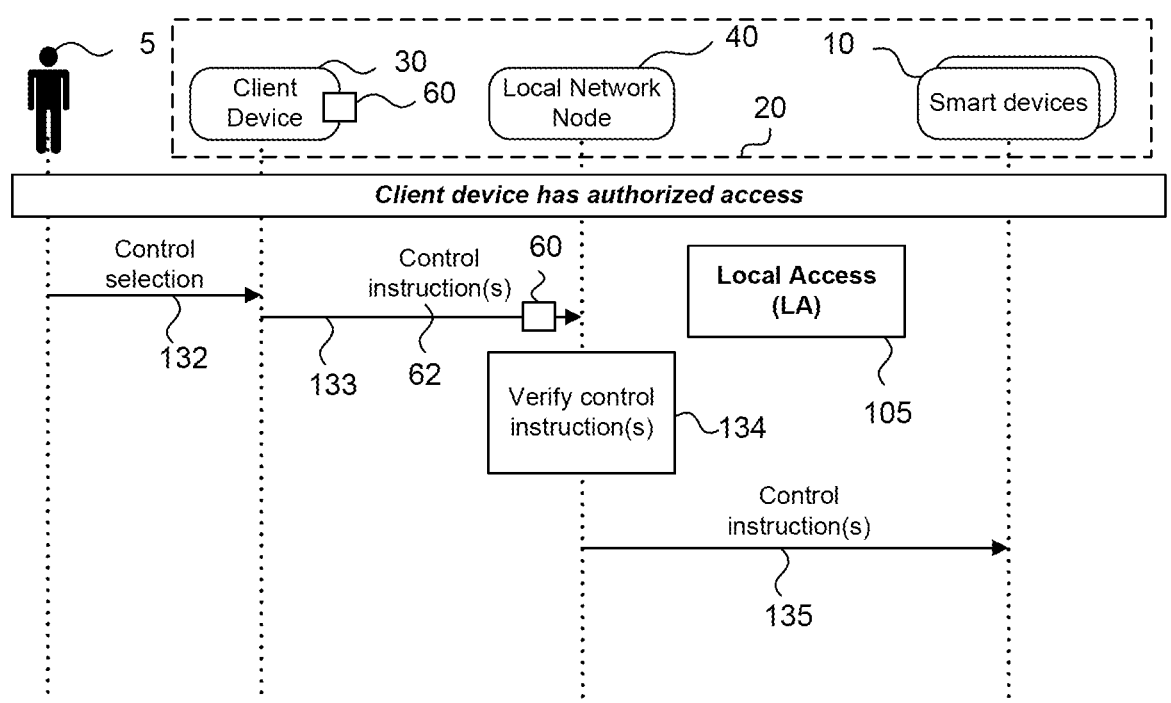
FIG. 4 is a flowchart diagram that illustrates local communication with smart devices provided a local environment.
Figure 5:
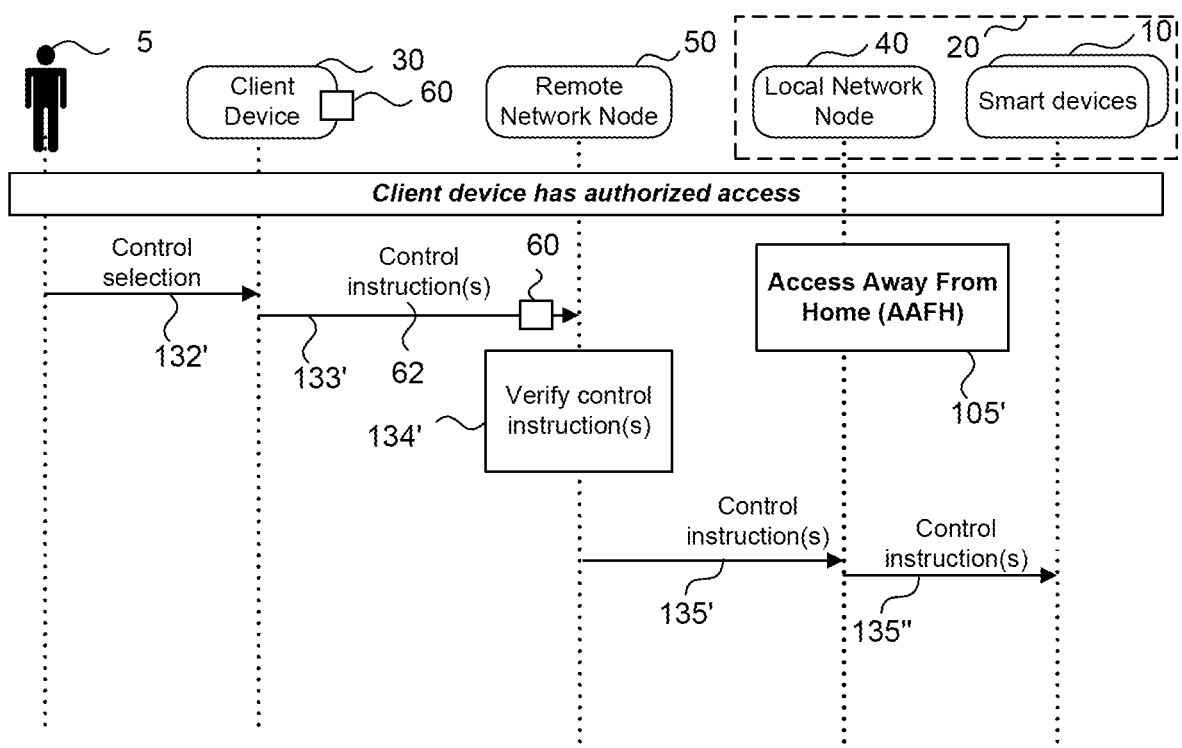
FIG. 5 is a flowchart diagram that illustrates remote communication with smart devices provided in a local environment.

FIGS. 4-5 illustrate flowcharts of communication between the client device 30 and the one or more smart devices 10. As is apparent from the drawings, this communication is performed after the client device 30 has authorized access, i.e. having received the access token 60.

The client device 30 may be configured to send 133 one or more control instructions 62, together with the access token 60, to the one or more smart devices 10. If the client device 30 is has received the access token 60, it proves that either one of the local or remote network node 40, 50 has generated the access token 60 and distributed it to the client device 30. To put it in other words, by having received the access token 60, the client device 30 is authorized to control the one or more smart devices 10 in which the client device 30 has previously requested access to control.

The control instructions 62 may be sent in response to the user 5 having selected 132 a control choice from e.g. a mobile application of the client device 30. This may be performed using any of the previously mentioned interaction and/or manipulation techniques. The control choice(s) may be indicative of any type of instruction that the smart devices 10 can receive. The control choice may, for instance, involve instructing a smart device 10 to perform a task, activate or deactivate itself or a part thereof, send a message to the local network node 40, the remote network node 50 or to any other smart device 10 within the local environment 20, and so forth. Such tasks may involve e.g. turning a light bulb on or off, dimming a light bulb, turning on or off a power outlet, controlling the volume of a speaker or activating electric blinds, etc.

In FIG. 4, an embodiment is shown wherein the client device 30 is in the LA mode 105. The one or more control instructions 62 are preferably verified before control, so that the client device 30 is authorized to control the smart devices 10. In the LA mode 105, the local network node 40 is configured to verify 134 the one or more control instructions 62. The verification process may involve several steps being related to verifying the authenticity of the access token 60 as provided by the client device 30. Verifying the authenticity of the access token 60 may, for instance, involve verifying that the authorization signature is valid, that the expiry time has not passed, and that the unique client device identifier (not shown) is associated with the client device 30 having sent the one or more control instructions 62. Once the control instructions 62 have been verified, the local network node 40 is configured to route 135 the instructions 62 directly to the target smart device 10. The user 5 of the client device 30 may decide the target smart device 10, along with the control selection.

In one embodiment, the client device 30 may have access authorization on different levels, corresponding to performing different actions or tasks for different smart devices 10. For instance, the client device 30 may be authorized to instruct a light bulb to deactivate itself, but the same client device 30 may not be authorized to unlock or lock a smart lock. Different smart devices 10 may thus be associated with different security levels, which may be regulated by e.g. the smart device itself 10, the local network node 40 and/or the remote network node 50. The access token 60 and/or the refresh token 70 may be associated with such security level information, so that the client device 30 can via e.g. a user interface view its current access level.

If one or more of the verification checks are not fulfilled, action may be taken. The user 5 of the client device 30 may be notified that access has been denied for the requested control choice. Such notification may involve a message, an error code as to why access was denied, and a possible remediation procedure to be performed for reconnection, if viable. In one embodiment, the access denied message may be sent to a remote central for further action. For instance, if it is detected that an unauthorized user is constantly sending a large number of control choices to the one or more smart devices 10, it may be an indication of a DDOS attack (Distributed Denial of Service). Hence, the user(s) being authorized in the associated IoT-system 100 may be notified, and the unauthorized user sending the plurality of control instructions 62 may be prohibited from doing so for a predetermined time period.

In FIG. 5, an embodiment is shown wherein the client device 30 is in the AAFH mode 105'. In FIG. 5, the client device 30 is provided with the access token 60, meaning that authorization has been given so as to enable the client device 30 to control the one or more smart devices 10. Similar to the LA mode 105, the client device 30 may be configured to send one or more control instructions 62, together with the access token 60, to the one or more smart devices 10. Further, the one or more control instructions 62 must first be verified so that the client device 30 is authorized to control the smart devices 10. In the AAFH mode 105', the remote network node 50 is configured to verify 134' the one or more control instructions 62. The verification process typically involves similar verification steps as in the LA mode 105. However, after verification of the control instruction 62, the remote network node 50 is configured to transmit 135', 135" instructions 62 via the local network node 40, before arriving at the target smart device 10. This is simply due the remote network node 50 not being directly connected to the smart devices 10, and communication need to pass the local network node 40 within the IoT-system 100.

Figure 6A:
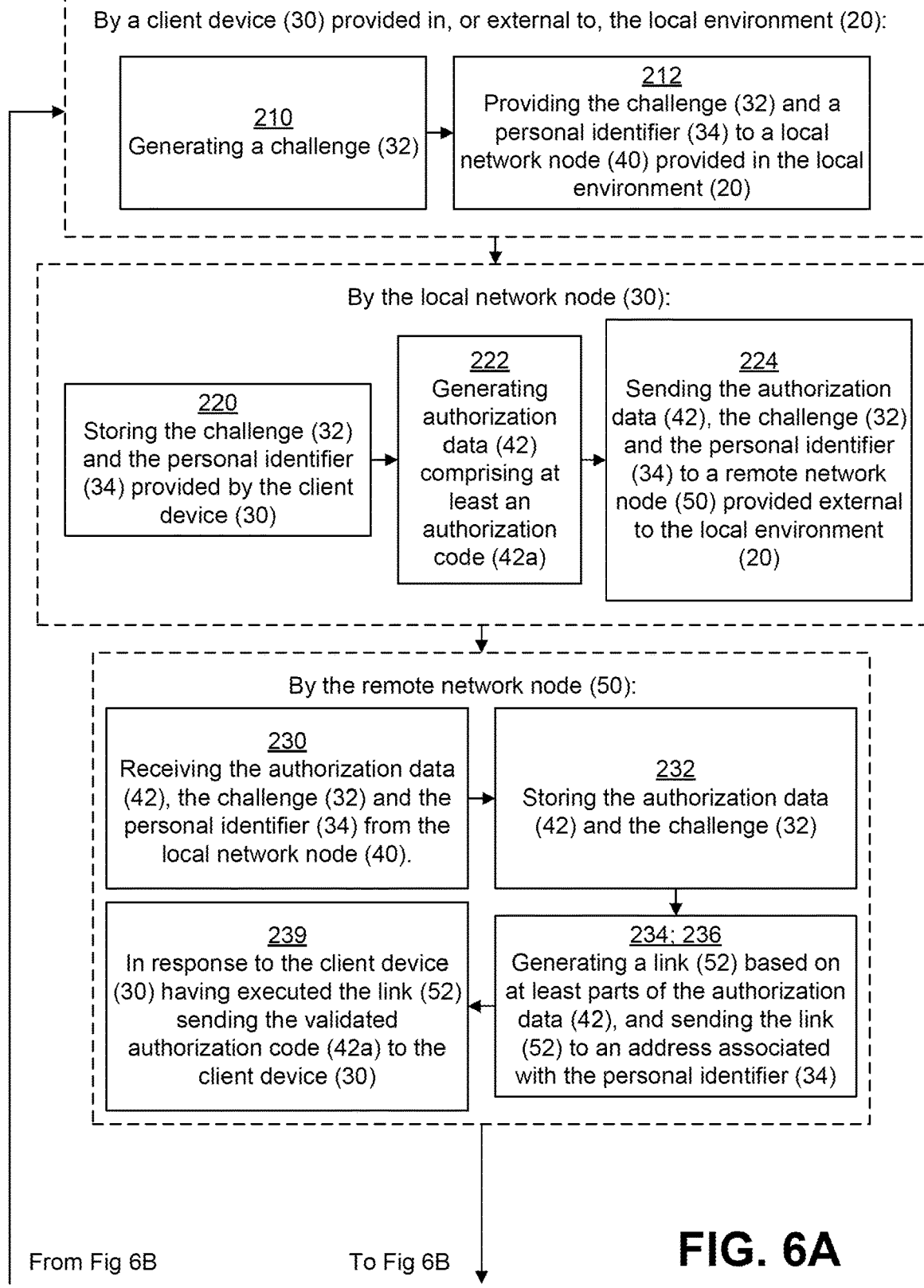
FIG. 6A illustrates a portion of a computer-implemented method according to one embodiment.
Figure 6B:
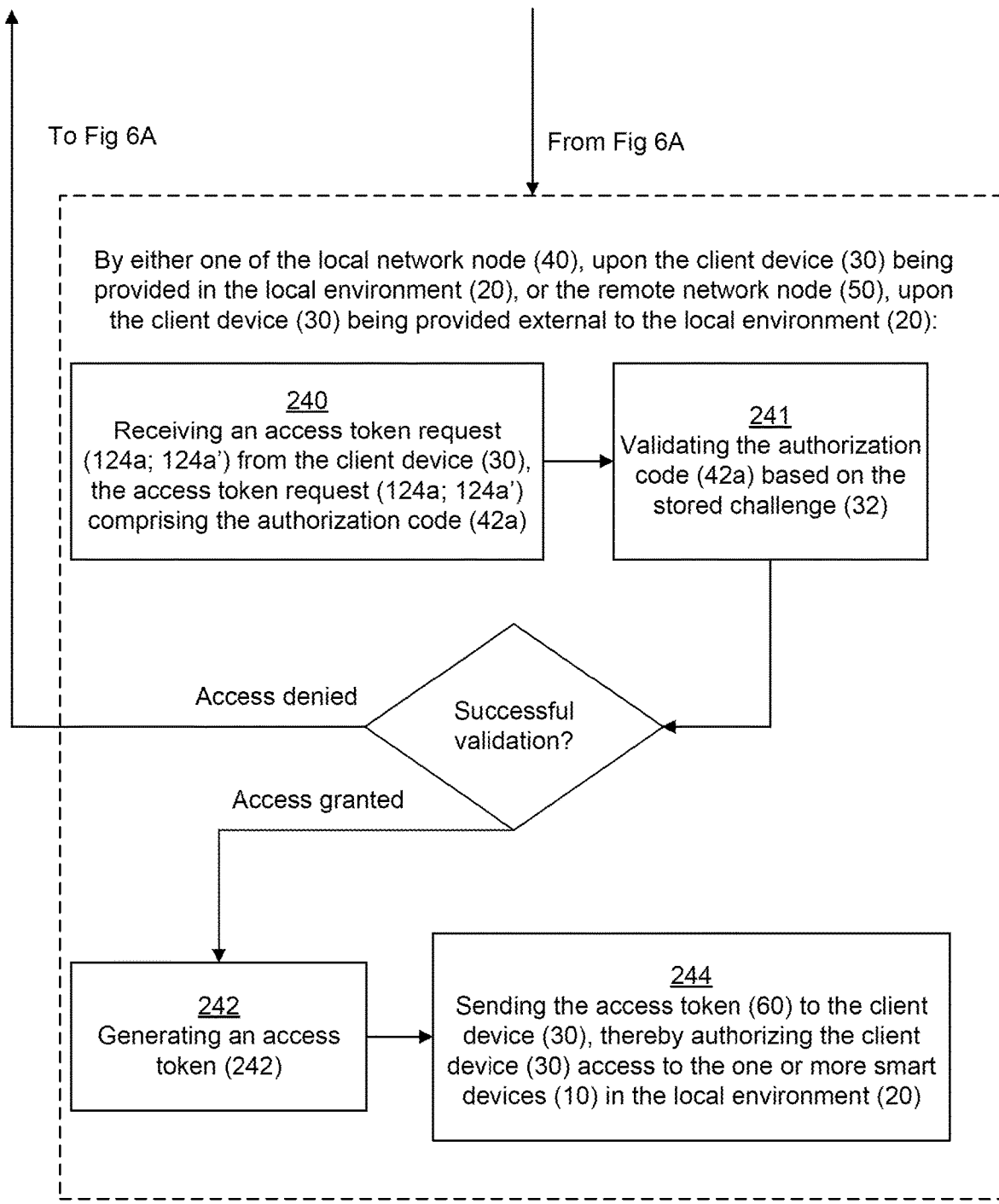
FIG. 6B illustrates a portion of a computer-implemented method according to one embodiment.

FIGS. 6*a*-*b* illustrate a computer-implemented method for authorizing access to the one or more smart devices 10 that are provided in the local environment 20. The shown method steps, 210, 212, 220, 222, 224, 230, 232, 234, 236, 238, 239, 240, 241 242, and 244 are generally performed in accordance with the flowcharts and description presented with reference to FIGS. 2 and 3.

Figure 7:
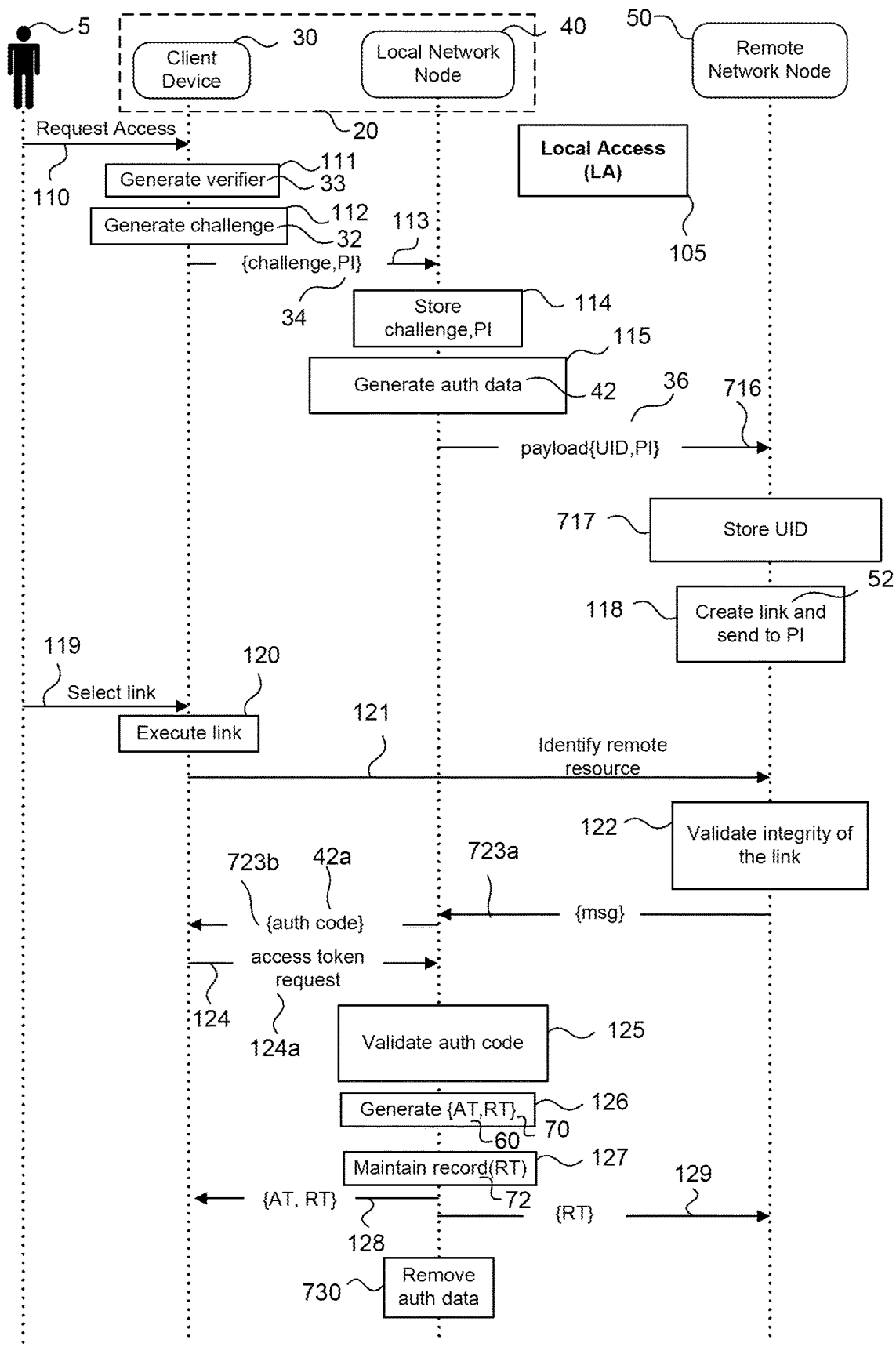
FIG. 7 is a flowchart diagram that illustrates access authorization according to an embodiment representing local access authorization.
Figure 8:
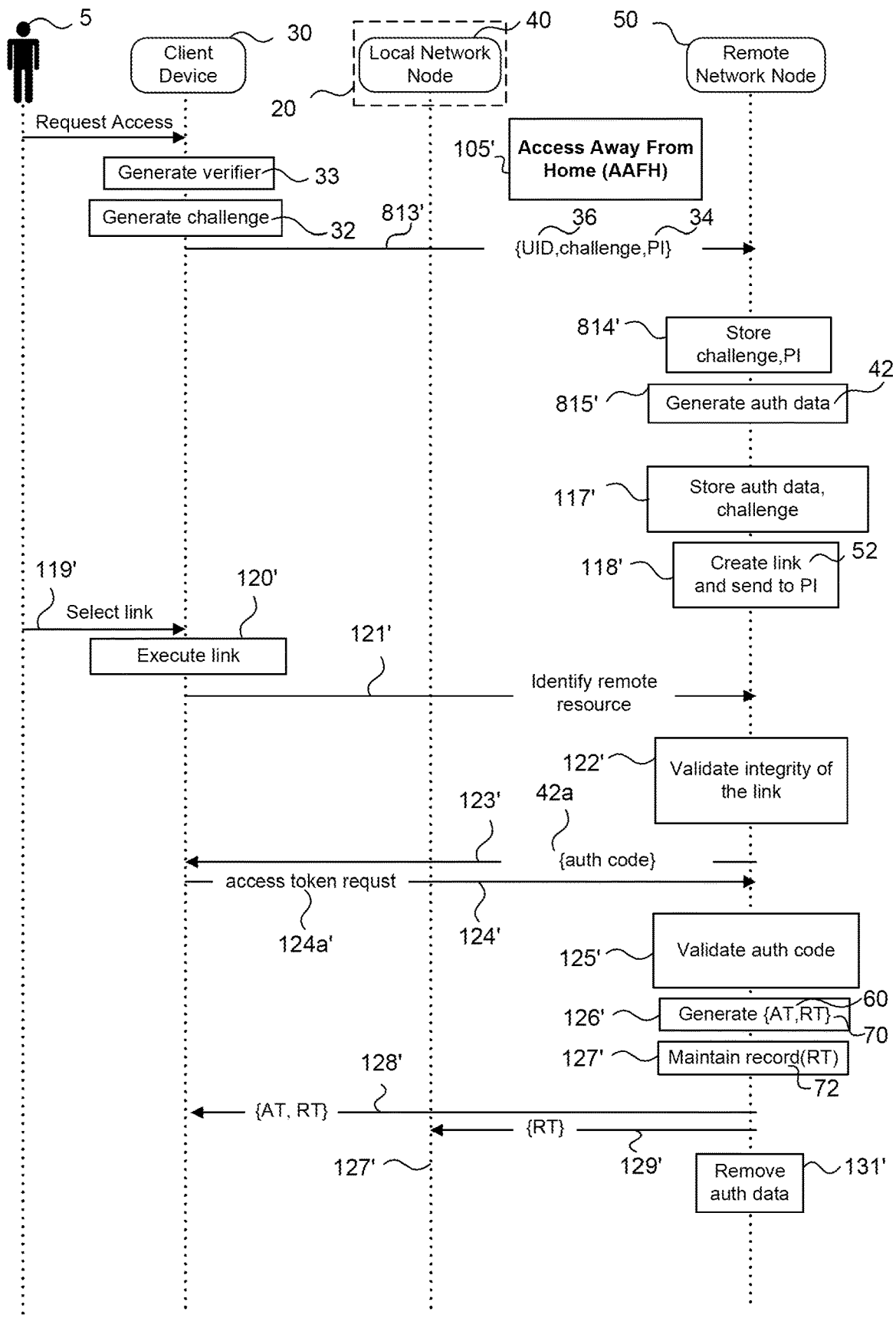
FIG. 8 is a flowchart diagram that illustrates access authorization according to an embodiment representing remote access authorization.

Turning now to FIGS. 7-8, two flowcharts of different embodiments of access authorization are visualized, which employ some of the inventive concepts of this disclosure. The flowcharts serve as exemplifying illustrations, which means that the access authorizations are by no means limited to the illustrations and description presented with reference to FIGS. 7-8. As the skilled person will realize, additional or fewer associated steps may be involved. FIGS. 7-8 present alternative implementations of the embodiments visualized and described with reference to FIGS. 2-3, having some further advantageous design decisions.

With reference to FIG. 7, a client device 30 is provided in the local environment 20 and is requesting access in a LA mode 105. The flowchart also illustrates the remote network node 50 provided external to the local environment 20, the local network node 40 provided in the local environment 20, and the user 5 of the client device 30. The user 5 is in most use cases present within the local environment 20, although certain scenarios where the user 5 is outside of the local environment 20 and interacting with the client device 30 being provided in the local environment 20 may be conceived.

Many of the steps of the flowchart of FIG. 7 correspond to those described with reference to FIG. 2, wherein same numbers (i.e. 110, 111, 112, 113, 114, 115, 119, 120, 121, 122, 124, 124a, 125, 126, 127, 128, 129) refer to same steps. On the other hand, there are some differences seen in the steps 716, 717, 723a, 723b, 730. In essence, these differentiating steps relate to the same feature which is that the authorization data 42 is not sent to the remote network node 50. The present inventor has realized that the authorization in local access mode 105 can be performed securely without exposing the authorization data 42 to the outside world, i.e. remotely. At 716, only the UID 36 and the personal identifier have to be sent to the remote network node 50. It is thus only the UID 36 that is stored at 717. Alternatively, the local network node 40 may send parts of the authorization data 42 excluding the authorization code 42a, for instance one or more of the randomly generated numbers as discussed with reference to FIG. 2.

Because of the remote network node 50 not having stored the authorization data 42, and thus not the authorization code 42a either, the remote network node 50 cannot send the authorization code 42a to the client device 30 once the integrity of the link is validated at 122. Instead, at 723a, the remote network node 50 is configured to notify the local network node 40 that the link has been validated, for instance by sending a message (msg) stating that a transaction has been verified. Alternatively, step 723a may involve notifying the local network node 40 by sending parts of the authorization data 42 excluding the authorization code 42a, for instance one or more of the randomly generated numbers.

After being notified that the link 52 is valid, the local network node 40 is configured to send the authorization code 42a to the client device 30 at 723b.

After the end of the distribution of the access token 60 and refresh token 70, the local network node 40 may be further configured to remove the remainder of the authorization data 730, for instance the randomly generated numbers.

With reference to FIG. 8, a client device 30 is provided external to the local environment 20 and is requesting access in the AAFH mode 105'. The flowchart also illustrates the remote network node 50 provided external to the local environment 20, the local network node 40 provided in the local environment 20, and the user 5 of the client device 30. The user 5 is in most use cases located external to the local environment 20, although certain scenarios where the user 5 is inside the local environment 20 and interacting with the client device 30 being provided external to the local environment 20 may be conceived.

Many of the steps of the flowchart of FIG. 8 correspond to those described with reference to FIG. 3, wherein same numbers (i.e. 117', 118', 119', 120', 121', 122', 123', 124', 125', 126', 127', 128', 129', 131') refer to same steps. On the other hand, there are some differences seen in the steps 813', 814' and 815'. In essence, these differentiating steps relate to the same feature which is that the local network node 40 is no longer involved in the authorization procedure for the AAFH 105' mode.

At 813', the client device 30 is configured to send the UID 36, challenge 32 and personal identifier 34 to the remote network node 50. The remote network node 50 is configured to store the challenge 32 and the personal identifier at 814', and generate the authorization data 42 at 815'. Accordingly, in this implementation, the local network node 40 no longer generates the authorization data 42. In fact, in the entire authorization procedure, the local network node 40 is not required.

The AAFH 105' authorization explained with reference to FIG. 8 requires that an access token 60 has previously been generated locally, for instance by any of the procedures seen in FIG. 2 or 7. Since the access token 60 has been signed by the local network node 40, the remote network node 50 knows which client device 30 is associated with which client device 30. The AAFH 105' authorization explained with reference to FIG. 8 may also be performed in cases where an access token 60 has not been previously generated, with some modifications to the authorization procedure. Modifications include that the remote network node 50 is configured to map personal identifiers with local network nodes 40 for determining which client device(s) 30 that are associated with which local network nodes(s) 40. This is performed prior to the generation of the authorization data 42.

Figure 9:
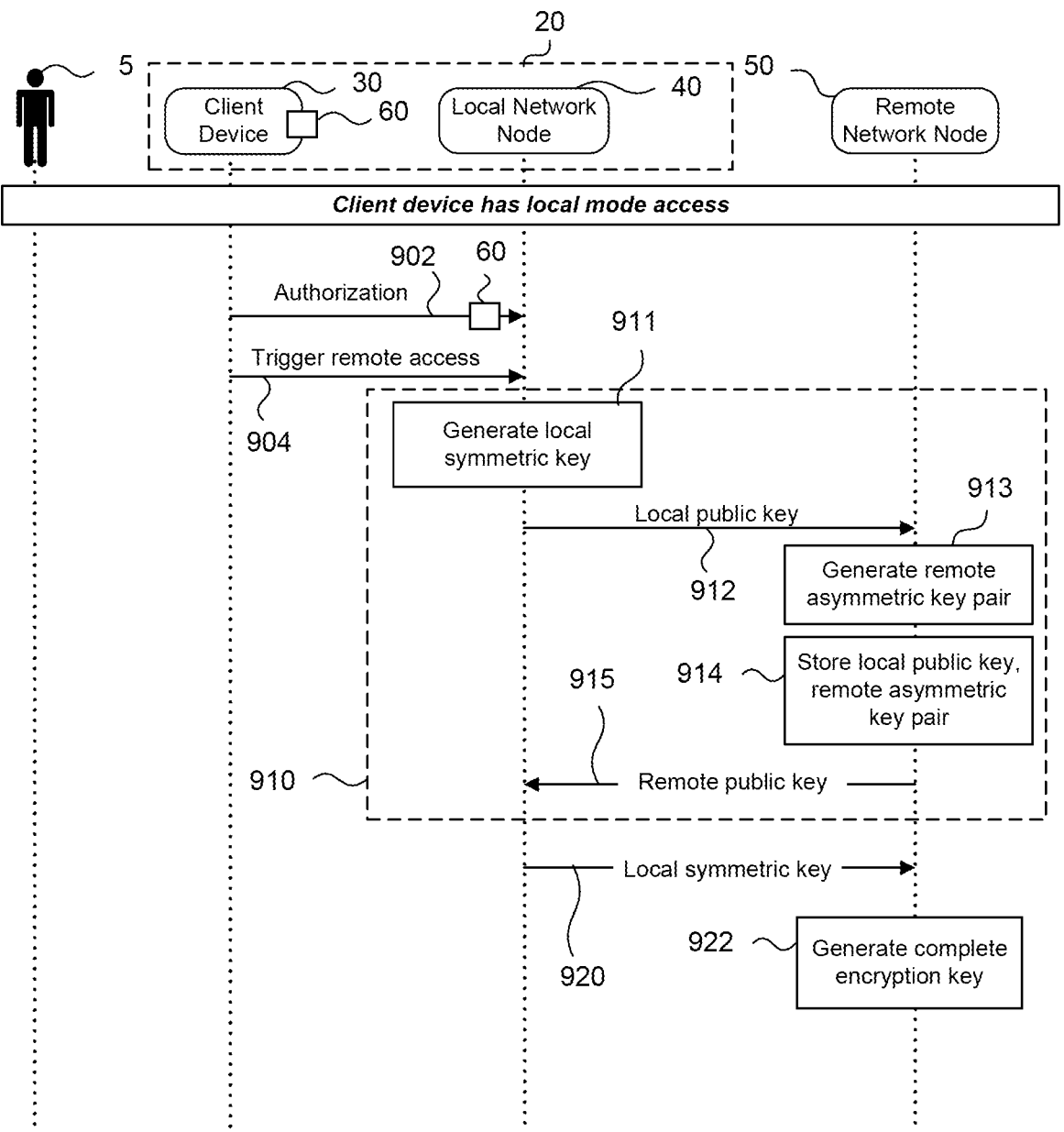
FIG. 9 is a flowchart diagram illustrating an embodiment of activation of remote access authorization by a client device being provided in a local environment.

In FIG. 9, a flowchart of remote access activation according to one embodiment is visualized. The remote access activation may be performed to allow both of the local network node 40 and the remote network node 50 to sign data once the access token 60 has been generated in the local access mode, for instance by the procedures of either one of FIG. 2 or 7. The client device 30 comprises a signed (validated) access token 60 and is provided in the local environment 20.

A first step 902 involves configuring the client device 30 to locally authorize by means of the access token 60. Subsequently, the client device 30 is configured to trigger remote access, thus triggering a key exchange 910 between the local network node 40 and the remote network node 50. As described in the present disclosure with reference to FIGS. 2 and 3 (which applies to FIGS. 7 and 8 as well), the local network node 40 and the remote network node 50 already have exchanged signing or encryption keys. These keys differ from the keys that are being generated in the key exchange 910 which will now be described.

The key exchange 910 comprises a first step 911 wherein the local network node 40 is configured to generate a local symmetric key. The local symmetric key may be generated by means of any suitable symmetric encryption technologies known in the art, such as AES.

At 912, the local network node 40 is configured to send its local public key to the remote network node 50. The local public key corresponds to the public key generated by the local network node 40 before access authorization was initiated, as discussed with reference to FIGS. 2 and 3 (which applies to FIGS. 7 and 8 as well).

At 913, the remote network node 50 is configured to generate a remote asymmetric key pair including a remote private key and a remote public key. The remote asymmetric key pair may be generated by means of any suitable asymmetric technologies known in the art, such as RSA or Diffie-Hellman key exchange. Hence, the remote asymmetric key pair is a second asymmetric key pair, i.e. not the same pair of asymmetric keys that were generated and exchanged between the local network node 40 and the remote network node 50 prior to the access authorization.

At 914, the remote asymmetric key pair is stored, together with the local public key.

At 915, the remote public key is shared with the local network node 40, thus finalizing the key exchange. Such a key exchange involves that the local network node 40 is in persistent connection mode with the remote network node 50, thus allowing both of the local and remote nodes 40, 50 to sign e.g. control data used to control the smart devices 10.

The remote access activation procedure may further involve the additional steps seen at 920 and 922. At 920, the local network node 40 is configured to send the local symmetric key to the remote network node 50. The remote network node 50 is further configured to generate a complete encryption key. The complete encryption key is generated by means of the local symmetric key and a remote symmetric key associated with the remote network node 50. The remote symmetric key may be a predefined symmetric key being generated using e.g. AES. The complete encryption key may be generated by concatenating the local symmetric key and the remote symmetric key and creating a hash of the concatenated local/remote symmetric keys, wherein the hash represents the complete encryption key. Any suitable hash functions known in the art may be used, such as SHA-1, SHA-2, SHA-3, SHA-256, MDS, CRC32, RIPEMD or BLAKE2. A salt may further be added to either one or all of the local symmetric key, remote symmetric key and the concatenated local/remote symmetric key before it is being hashed.

The complete encryption key may be used to encrypt the personal identifier. The complete encryption key may in some embodiments be further used to encrypt additional data, for instance data relating to the client device 30 or its user(s), the smart devices 10 or the local network node 40, which may be considered sensitive.

The complete encryption key is preferably never stored at the remote network node 50. A new complete encryption key may thus be generated every time the remote network node 50 receives the local symmetric key from the local network node 40, and be used for encryption or decryption of data. To this end, any message sent between the local network node 40 and the remote network node 50 may be accompanied by the local symmetric key such that the remote network node 50 is capable of generating the complete encryption key. Due to the deterministic nature of hash functions, the complete encryption key will always be the same, provided that the same keys, i.e. the local symmetric key and the remote symmetric key, are used for its generation.

Figure 10B:
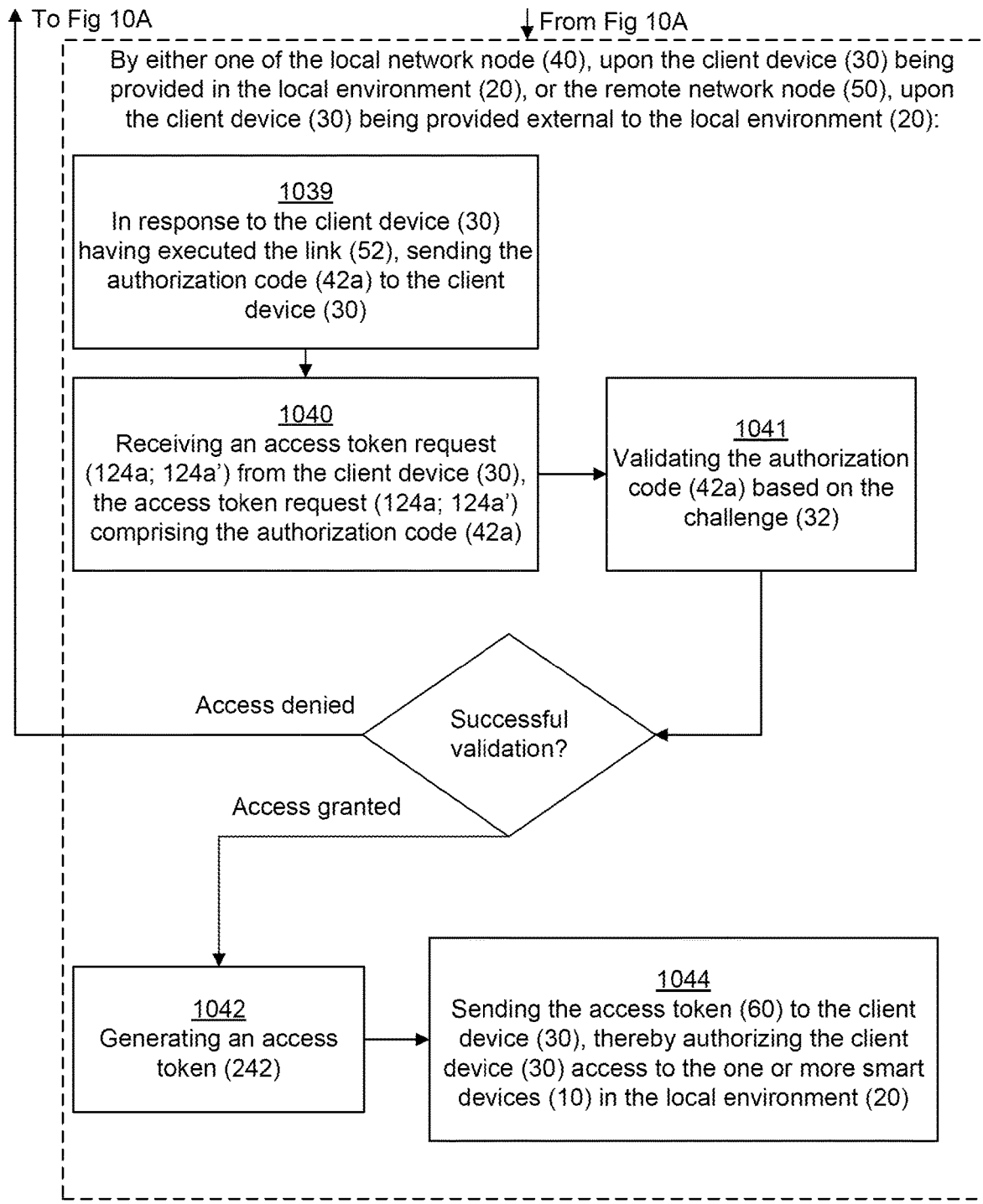
FIG. 10B illustrates a portion of a computer-implemented method according to one embodiment.

FIGS. 10*a-b* illustrate a computer-implemented method for authorizing access to the one or more smart devices 10 that are provided in the local environment 20. The shown method steps, 1010, 1012, 1022, 1024, 1034, 1036, 1039, 1040, 1041, 1042 and 1044 are generally performed in accordance with the flowcharts and description presented with reference to FIGS. 7 and 8. The skilled person appreciates that the "access denied" event seen in FIG. 10*b* does not necessarily result in a restart of the authorization procedure. Alternatively, in some implementations, an access denied event may lead to either one of the preceding steps being repeated until a potential access granted event occurs.

Further alternative aspects of the present disclosure are described in the following numbered clauses.

Clause 1: A computer-implemented system (100) for authorizing access to one or more smart devices (10) provided in a local environment (20), the system (100) comprising: a client device (30) provided in, or external to, the local environment (20); a local network node (40) provided in the local environment (20); and a remote network node (50) provided external to the local environment (20); the client device (30) being configured to: generate a challenge (32), and provide the challenge (32) and a personal identifier (34) to the local network node (40); the local network node (40) being configured to: store the challenge (32) and the personal identifier (34) provided by the client device (30), generate authorization data (42) comprising at least an authorization code (42*a*), and send the authorization data (42), the challenge (32) and the personal identifier (34) to the remote network node (50); and the remote network node (50) being configured to: receive the authorization data (42), the challenge (32) and the personal identifier (34) from the local network node (40), store the authorization data (42) and the challenge (32), generate a link (52) based on at least parts of the authorization data (42), and send the link (52) to an address associated with the personal identifier (34), and in response to the client device (30) having executed the link (52), send the authorization code (42*a*) to the client device (30); wherein either one of: the local network node (40), upon the client device (30) being provided in the local environment (20), or the remote network node (50), upon the client device (30) being provided external to the local environment (20), is configured to: receive an access token request (124*a*; 124*a*') from the client device (30), the access token request (124*a*; 124*a*') comprising the authorization code (42*a*), validate the authorization code (42*a*) based on the stored challenge (32), and upon successful validation of the authorization code (42*a*): generate an access token (60), and send the access token (60) to the client device (30), thereby authorizing the client device (30) access to the one or more smart devices (10) in the local environment (20).

Clause 2: The computer-implemented system (100) according to clause 1, wherein after receiving the access token (60), the client device (30) is enabled to send one or more control instructions (62) together with the access token (60) to the one or more smart devices (10).

Clause 3: The computer-implemented system (100) according to any of the preceding clauses, wherein the access token (60) comprises an authorization signature and an expiry time, and is associated with a unique client device identifier (36).

Clause 4: The computer-implemented system (100) according to clause 3, wherein either one of the local network node (40), upon the client device (30) being provided in the local environment (20), or the remote network node (50), upon the client device (30) being provided external to the local environment (20), is configured to verify the one or more control instructions (62) by verifying that: the authorization signature is valid, the expiry time has not passed, and the unique client device identifier (36) is associated with the client device (30).

Clause 5: The computer-implemented system (100) according to any of the preceding clauses, wherein either one of the local network node (40), upon the client device (30) being provided in the local environment (20), or the remote network node (50), upon the client device (30) being provided external to the local environment (20), is configured to: generate a refresh token (70) being associated with the access token (60), send the refresh token (70) to the client device (30) together with the access token (70), and send the refresh token (70) to the local network node (40) upon being generated by the remote network node (50), or send the refresh token (70) to the remote network node (50) upon being was generated by the local network node (40), wherein the refresh token (70) comprises an expiry time and is associated with a unique client device identifier (36).

Clause 6: computer-implemented system (100) according to clause 5, wherein the local network node (40) and the remote network node (50) are configured to maintain a record (72) of each generated refresh token (70).

Clause 7: The computer-implemented system (100) according to clause 6, wherein the local network node (40), upon the client device (30) being provided in the local environment (20), or the remote network node (50), upon the client device (30) being provided external to the local environment (20), is configured to generate a new access token upon the previous access token (60) being invalid, based on data in the record (72) of the refresh token (70) being associated with the previous access token (60).

Clause 8: The computer-implemented system (100) according to any of the clauses 5 to 7, wherein the local network node (40), upon the client device (30) being provided in the local environment (20), or the remote network node (50), upon the client device (30) being provided external to the local environment (20), is configured to generate a new refresh token upon: the expiry time of the previous refresh token (70) having passed, or the client device (30) having requested a new access token using the previous refresh token (70).

Clause 9: The computer-implemented system (100) according to any of the preceding clauses, wherein the authorization data (42) further comprises one or more randomly generated numbers, wherein the link (52) is based on the one or more randomly generated numbers.

Clause 10: The computer-implemented system (100) according to clause 9, wherein in response to the client device (30) having executed the link (52), the remote network node (50) is configured to: discard the one or more randomly generated numbers, and send the authorization code (42a) to the client device (30).

Clause 11: The computer-implemented system (100) according to any one of the clauses 9 or 10, wherein the access token request (124a; 124a') further comprises a verifier (33) associated with the challenge (32), and wherein validating the authorization code (42a) involves: generating a control challenge for the authorization code (42a) based on the verifier (33), and comparing said generated control challenge to the stored challenge (32).

Clause 12: The computer-implemented system (100) according to any one of the clauses 9 to 11, wherein the link (52) identifies a resource at the remote network node (50), and wherein execution of the link (52) by the client device (30) triggers the identified resource at the remote network node (50), thereby validating the integrity of the link (52).

Clause 13: The computer-implemented system (100) according to any of the preceding clauses, wherein after the access token (60) has been generated, the local network node (40) and/or the remote network node (50) is/are configured to discard the authorization data (42).

Clause 14: The computer-implemented system (100) according to any of the preceding clauses, wherein the one or more smart devices (10) are selected from the group consisting of home furnishing, home appliances, home equipment, office furnishing, office appliances and office equipment.

Clause 15: A computer-implemented method (200) for authorizing access to one or more smart devices (10) provided in a local environment (20), the method (200) involving: by a client device (30) provided in, or external to, the local environment (20): generating (210) a challenge (32); and providing (212) the challenge (32) and a personal identifier (34) to a local network node (40) provided in the local environment (20); by the local network node (40): storing (220) the challenge (32) and the personal identifier (34) provided by the client device (30); generating (222) authorization data (42) comprising at least an authorization code (42a); and sending (224) the authorization data (42), the challenge (32) and the personal identifier (34) to a remote network node (50) provided external to the local environment (20); and by the remote network node (50): receiving (230) the authorization data (42), the challenge (32) and the personal identifier (34) from the local network node (40); storing (232) the authorization data (42) and the challenge (32); generating (234) a link (52) based on at least parts of the authorization data (42), and sending (236) the link (52) to an address associated with the personal identifier (34); and in response to the client device (30) having executed the link (52), sending (239) the authorization code (42a) to the client device (30); wherein the method (200) further involves, by either one of: the local network node (40), upon the client device (30) being provided in the local environment (20), or the remote network node (50), upon the client device (30) being provided external to the local environment (20): receiving (240) an access token request (124a; 124a') from the client device (30), the access token request (124a; 124a') comprising the authorization code (42a), validating (241) the authorization code (42a) based on the stored challenge (32), and upon successful validation of the authorization code (42a): generating (242) an access token (60), and sending (244) the access token (60) to the client device (30), thereby authorizing the client device (30) access to the one or more smart devices (10) in the local environment (20).

Clause 16: A computer-implemented system (100) for authorizing access to one or more smart devices (10) provided in a local environment (20), the system (100) comprising: a client device (30) provided in, or external to, the local environment (20); a local network node (40) provided in the local environment (20); and a remote network node (50) provided external to the local environment (20); wherein the client device (30) is configured to: generate a challenge (32), and provide the challenge (32) and a personal identifier (34) to the local network node (40) upon the client device (30) being provided in the local environment, or to the remote network node (50) upon the client device (30) being provided external to the local environment; wherein either one of the local network node (40), upon the client device (30) being provided in the local environment, or the remote network node (50), upon the client device (30) being provided external to the local environment (20), is configured to: generate authorization data (42) comprising at least an authorization code (42a); wherein the local network node (40), upon the client device (30) being provided in the local environment, is configured to: send the personal identifier (34) to the remote network node (50); wherein the remote network node (50) is configured to: generate a link (52) and send the link (52) to an address associated with the personal identifier (34); and wherein either one of the local network node (40), upon the client device (30) being provided in the local environment, or the remote network node (50), upon the client device (30) being provided external to the local environment (20), is configured to: in response to the client device (30) having executed the link (52), send the authorization code (42a) to the client device (30), receive an access token request (124a; 124a') from the client device (30), the access token request (124a; 124a') comprising the authorization code (42a), validate the authorization code (42a) based on the challenge (32), and upon successful validation of the authorization code (42a): generate an access token (60), and send the access token (60) to the client device (30), thereby authorizing the client device (30) access to the one or more smart devices (10) in the local environment (20).

Clause 17: The computer-implemented system (100) according to clause 16, wherein after receiving the access token (60), the client device (30) is enabled to send one or more control instructions (62) together with the access token (60) to the one or more smart devices (10).

Clause 18: The computer-implemented system (100) according to clause 17, wherein the access token (60) comprises an authorization signature and an expiry time, and is associated with a unique client device identifier (36).

Clause 19: The computer-implemented system (100) according to clause 18, wherein either one of the local network node (40), upon the client device (30) being provided in the local environment (20), or the remote network node (50), upon the client device (30) being provided external to the local environment (20), is configured to verify the one or more control instructions (62) by verifying that: the authorization signature is valid, the expiry time has not passed, and the unique client device identifier (36) is associated with the client device (30).

Clause 20: The computer-implemented system (100) according to any of the clauses 16-19, wherein either one of the local network node (40), upon the client device (30) being provided in the local environment (20), or the remote network node (50), upon the client device (30) being provided external to the local environment (20), is configured to: generate a refresh token (70) being associated with the access token (60), send the refresh token (70) to the client device (30) together with the access token (70), and send the refresh token (70) to the local network node (40) upon being generated by the remote network node (50), or send the refresh token (70) to the remote network node (50) upon being generated by the local network node (40), wherein the refresh token (70) comprises an expiry time and is associated with a unique client device identifier (36).

Clause 21: The computer-implemented system (100) according to clause 20, wherein the local network node (40) and the remote network node (50) are configured to maintain a record (72) of each generated refresh token (70).

Clause 22: The computer-implemented system (100) according to clause 21, wherein the local network node (40), upon the client device (30) being provided in the local environment (20), or the remote network node (50), upon the client device (30) being provided external to the local environment (20), is configured to generate a new access token upon the previous access token (60) being invalid, based on data in the record (72) of the refresh token (70) being associated with the previous access token (60).

Clause 23: The computer-implemented system (100) according to any of the clauses 20 to 22, wherein the local network node (40), upon the client device (30) being provided in the local environment (20), or the remote network node (50), upon the client device (30) being provided external to the local environment (20), is configured to generate a new refresh token upon: the expiry time of the previous refresh token (70) having passed, or the client device (30) having requested a new access token using the previous refresh token (70).

Clause 24: The computer-implemented system (100) according to any of the clauses 16-23, wherein the access token (60) is provided for the client device (30) in the local environment (20), the local network node (40) being configured to generate a local symmetric key, the remote network node (50) being configured to generate a remote asymmetric key pair including a remote private key and a remote public key, wherein the local network node (40) and the remote network node (50) are configured to perform a key exchange.

Clause 25: The computer-implemented system (100) according to clause 24, wherein the remote network node (50) is further configured to generate a complete encryption key by means of the local symmetric key and a remote symmetric key stored at the remote network node (50).

Clause 26: The computer-implemented system (100) according to any of the clauses 16-25, wherein the authorization data (42) further comprises one or more randomly generated numbers, wherein the link (52) is based on the one or more randomly generated numbers.

Clause 27: The computer-implemented system (100) according to clause 26, wherein in response to the client device (30) having executed the link (52), the remote network node (50) is configured to: discard the one or more randomly generated numbers, and send the authorization code (42*a*) to the client device (30).

Clause 28: The computer-implemented system (100) according to any of the clauses 16-27, wherein the access token request (124*a*; 124*a*') further comprises a verifier (33) associated with the challenge (32), and wherein validating the authorization code (42*a*) involves: generating a control challenge for the authorization code (42*a*) based on the verifier (33), and comparing said generated control challenge to the challenge (32).

Clause 29: The computer-implemented system (100) according to any of the clauses 16-28, wherein the link (52) identifies a resource at the remote network node (50), and wherein execution of the link (52) by the client device (30) triggers the identified resource at the remote network node (50), thereby validating the integrity of the link (52).

Clause 30: The computer-implemented system (100) according to any of the clauses 16-29, wherein the one or more smart devices (10) are selected from the group consisting of home furnishing, home appliances, home equipment, office furnishing, office appliances and office equipment.

Clause 31: A computer-implemented method (1000) for authorizing access to one or more smart devices (10) provided in a local environment (20), the method (1000) involving: by a client device (30) provided in, or external to, the local environment (20): generating (1010) a challenge (32); and providing (1012) the challenge (32) and a personal identifier (34) to a local network node (40) provided in the local environment (20) upon the client device (30) being provided in the local environment, or to a remote network node (50) provided external to the local environment (20) upon the client device (30) being provided external to the local environment (20); by either one of the local network node (40), upon the client device (30) being provided in the local environment, or the remote network node (50), upon the client device (30) being provided external to the local environment (20): generating (1022) authorization data (42) comprising at least an authorization code (42*a*); and by the local network node (40), upon the client device (30) being provided in the local environment: sending (1024) the personal identifier (34) to the remote network node (50); by the remote network node (50): generating (1034) a link (52), and sending (1036) the link (52) to an address associated with the personal identifier (34); and by either one of the local network node (40), upon the client device (30) being provided in the local environment, or the remote network node (50), upon the client device (30) being provided external to the local environment (20): in response to the client device (30) having executed the link (52), sending (1039) the authorization code (42*a*) to the client device (30); receiving (1040) an access token request (124*a*; 124*a*') from the client device (30), the access token request (124*a*; 124*a*') comprising the authorization code (42*a*), validating (1041) the authorization code (42*a*) based on the challenge (32), and upon successful validation of the authorization code (42*a*): generating (1042) an access token (60), and sending (1044) the access token (60) to the client device (30), thereby authorizing the client device (30) access to the one or more smart devices (10) in the local environment (20).

Clause 32: The computer-implemented method (1000) according to clause 31, wherein after receiving the access token (60), the client device (30) sends one or more control instructions (62) together with the access token (60) to the one or more smart devices (10).

Clause 33: The computer-implemented method (1000) according to clause 32, wherein the access token (60) comprises an authorization signature and an expiry time, and is associated with a unique client device identifier (36), wherein the method further involves, by the local network node (40), upon the client device (30) being provided in the local environment (20), or by the remote network node (50), upon the client device (30) being provided external to the local environment (20), verifying the one or more control instructions (62) by verifying: the validity of the authorization signature, that the expiry time has not passed, and that the unique client device identifier (36) is associated with the client device (30).

Clause 34: The computer-implemented method (1000) according to any one of the clauses 31-33, wherein the access token (60) is provided for the client device (30) in the local environment (20), the method further involving: by the local network node (40), generating a local symmetric key, by the remote network node (50), generating a remote asymmetric key pair including a remote private key and a remote public key, and performing a key exchange between the remote network node (50) and the local network node (40).

Clause 35: The computer-implemented method (1000) according to clause 34, wherein the method further involves, by the remote network node (50), generating a complete encryption key by means of the local symmetric key and a remote symmetric key stored at the remote network node (50).

The invention has been described above in detail with reference to embodiments thereof. However, as is readily understood by those skilled in the art, other embodiments are equally possible within the scope of the present invention, as defined by the appended claims.

What is claimed is:

1. A computer-implemented system for authorizing access to one or more smart devices provided in a local environment, the computer-implemented system comprising:
a smart mobile communication device comprising memory and a processor provided in, or external to, the local environment;
a local internet of things gateway provided in the local environment;
and a remote cloud-based service provided external to the local environment;
wherein the smart mobile communication device is configured to:
generate a challenge, and
provide the challenge and a personal identifier to the local internet of things gateway upon the smart mobile communication device being provided in the local environment, or to the remote cloud-based service upon the smart mobile communication device being provided external to the local environment;
wherein either one of the local internet of things gateway, upon the smart mobile communication device being provided in the local environment, or the remote cloud-based service, upon the smart mobile communication device being provided external to the local environment, is configured to:
generate authorization data comprising at least an authorization code; wherein the local internet of things gateway, upon the smart mobile communication device being provided in the local environment, is configured to:
send the personal identifier to the remote cloud-based service; wherein the remote cloud-based service is configured to:
generate a link and send the link to an address associated with the personal identifier;
and wherein either one of the local internet of things gateway, upon the smart mobile communication device being provided in the local environment, or the remote cloud-based service, upon the smart mobile communication device being provided external to the local environment, is configured to:
in response to the smart mobile communication device having executed the link, send the authorization code to the smart mobile communication device,
receive an access token request from the smart mobile communication device, the access token request comprising the authorization code,
validate the authorization code based on the challenge, and upon successful validation of the authorization code:
generate an access token, and
send the access token to the smart mobile communication device, thereby authorizing the smart mobile communication device access to the one or more smart devices in the local environment.

2. The computer-implemented system according to claim 1, wherein after receiving the access token, the smart mobile communication device is enabled to send one or more control instructions together with the access token to the one or more smart devices.

3. The computer-implemented system according to claim 2, wherein the access token comprises an authorization signature and an expiry time, and is associated with a unique smart mobile communication device identifier.

4. The computer-implemented system according to claim 3, wherein either one of the local internet of things gateway, upon the smart mobile communication device being provided in the local environment, or the remote cloud-based service, upon the smart mobile communication device being provided external to the local environment, is configured to verify the one or more control instructions by verifying that:
the authorization signature is valid,
the expiry time has not passed, and
the unique smart mobile communication device identifier is associated with the smart mobile communication device.

5. The computer-implemented system according to claim 1, wherein either one of the local internet of things gateway, upon the smart mobile communication device being provided in the local environment, or the remote cloud-based service, upon the smart mobile communication device being provided external to the local environment, is configured to:
generate a refresh token being associated with the access token,
send the refresh token to the smart mobile communication device together with the access token, and
send the refresh token to the local internet of things gateway upon being generated by the remote cloud-based service, or send the refresh token to the remote cloud-based service upon being generated by the local internet of things gateway, wherein the refresh token comprises an expiry time and is associated with a unique smart mobile communication device identifier.

6. The computer-implemented system according to claim 5, wherein the local internet of things gateway and the remote cloud-based service are configured to maintain a record of each generated refresh token.

7. The computer-implemented system according to claim 6, wherein the local internet of things gateway, upon the smart mobile communication device being provided in the local environment, or the remote cloud-based service, upon the smart mobile communication device being provided external to the local environment, is configured to generate a new access token upon the previous access token being invalid, based on data in the record of the refresh token being associated with the previous access token.

8. The computer-implemented system according to claim 5, wherein the local internet of things gateway, upon the smart mobile communication device being provided in the local environment, or the remote cloud-based service, upon the smart mobile communication device being provided external to the local environment, is configured to generate a new refresh token upon:
the expiry time of the previous refresh token having passed, or
the smart mobile communication device having requested a new access token using the previous refresh token.

9. The computer-implemented system according to claim 1, wherein the access token is provided for the smart mobile communication device in the local environment, the local internet of things gateway being configured to generate a local symmetric key, the remote cloud-based service being configured to generate a remote asymmetric key pair including a remote private key and a remote public key, wherein the local internet of things gateway and the remote cloud-based service are configured to perform a key exchange.

10. The computer-implemented system according to claim 9, wherein the remote cloud-based service is further configured to generate a complete encryption key by means of the local symmetric key and a remote symmetric key stored at the remote cloud-based service.

11. The computer-implemented system according to claim 1, wherein the authorization data further comprises one or more randomly generated numbers, wherein the link is based on the one or more randomly generated numbers.

12. The computer-implemented system according to claim 11, wherein in response to the smart mobile communication device having executed the link, the remote cloud-based service is configured to:
discard the one or more randomly generated numbers, and
send the authorization code to the smart mobile communication device.

13. The computer-implemented system according to claim 1, wherein the access token request further comprises a verifier associated with the challenge, and wherein validating the authorization code involves:
generating a control challenge for the authorization code based on the verifier, and
comparing said generated control challenge to the challenge.

14. The computer-implemented system according to claim 1, wherein the link identifies a resource at the remote cloud-based service, and wherein execution of the link by the smart mobile communication device triggers the identified resource at the remote cloud-based service, thereby validating the integrity of the link.

15. The computer-implemented system according to claim 1, wherein the one or more smart devices are selected from the group consisting of home furnishing, home appliances, home equipment, office furnishing, office appliances and office equipment.

16. A computer-implemented method for authorizing access to one or more smart devices provided in a local environment, the method involving:
by a smart mobile communication device provided in, or external to, the local environment:
generating a challenge;
and providing the challenge and a personal identifier to a local internet of things gateway provided in the local environment upon the smart mobile communication device being provided in the local environment, or to a remote cloud-based service provided external to the local environment upon the smart mobile communication device being provided external to the local environment;
by either one of the local internet of things gateway, upon the smart mobile communication device being provided in the local environment, or the remote cloud-based service, upon the smart mobile communication device being provided external to the local environment:
generating authorization data comprising at least an authorization code;
by the local internet of things gateway, upon the smart mobile communication device being provided in the local environment:
sending the personal identifier to the remote cloud-based service;
by the remote cloud-based service:
generating a link, and sending the link to an address associated with the personal identifier;
and by either one of the local internet of things gateway, upon the smart mobile communication device being provided in the local environment, or the remote cloud-based service, upon the smart mobile communication device being provided external to the local environment:
in response to the smart mobile communication device having executed the link, sending the authorization code to the smart mobile communication device;
receiving an access token request from the smart mobile communication device, the access token request comprising the authorization code,
validating the authorization code based on the challenge, and
upon successful validation of the authorization code:
generating an access token, and
sending the access token to the smart mobile communication device, thereby authorizing the smart mobile communication device access to the one or more smart devices in the local environment.

17. The computer-implemented method according to claim 16, wherein after receiving the access token, the smart mobile communication device sends one or more control instructions together with the access token to the one or more smart devices.

18. The computer-implemented method according to claim 17, wherein the access token comprises an authorization signature and an expiry time, and is associated with a unique smart mobile communication device identifier, wherein the method further involves, by the local internet of things gateway, upon the smart mobile communication device being provided in the local environment, or by the remote cloud-based service, upon the smart mobile communication device being provided external to the local environment, verifying the one or more control instructions by verifying:
- the validity of the authorization signature,
- that the expiry time has not passed, and
- that the unique smart mobile communication device identifier is associated with the smart mobile communication device.

19. The computer-implemented method according to claim 16, wherein the access token is provided for the smart mobile communication device in the local environment, the method further involving:
- by the local internet of things gateway, generating a local symmetric key,
- by the remote cloud-based service, generating a remote asymmetric key pair including a remote private key and a remote public key, and
- performing a key exchange between the remote cloud-based service and the local internet of things gateway.

20. The computer-implemented method according to claim 19, wherein the method further involves, by the remote cloud-based service, generating a complete encryption key by means of the local symmetric key and a remote symmetric key stored at the remote cloud-based service.

* * * * *